April 29, 1952 J. E. MAKANT ET AL 2,594,782
CONTROL FOR MACHINE TOOLS
Filed Oct. 9, 1947 9 Sheets-Sheet 1
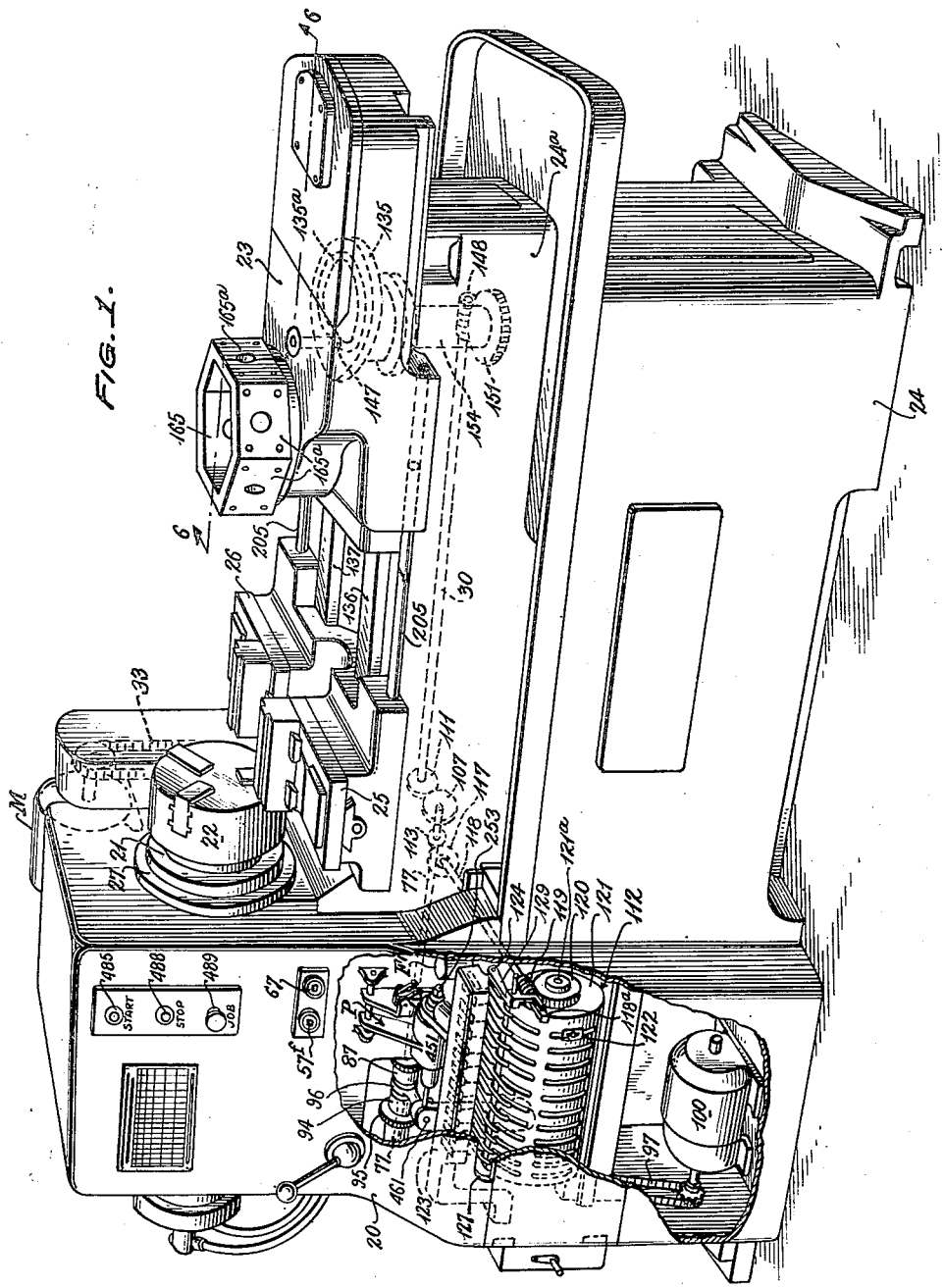
INVENTORS
JOSEPH E. MAKANT,
GORDON W. SMITHSON AND
KENNETH R. WUNSCHEL
BY
ATTORNEY

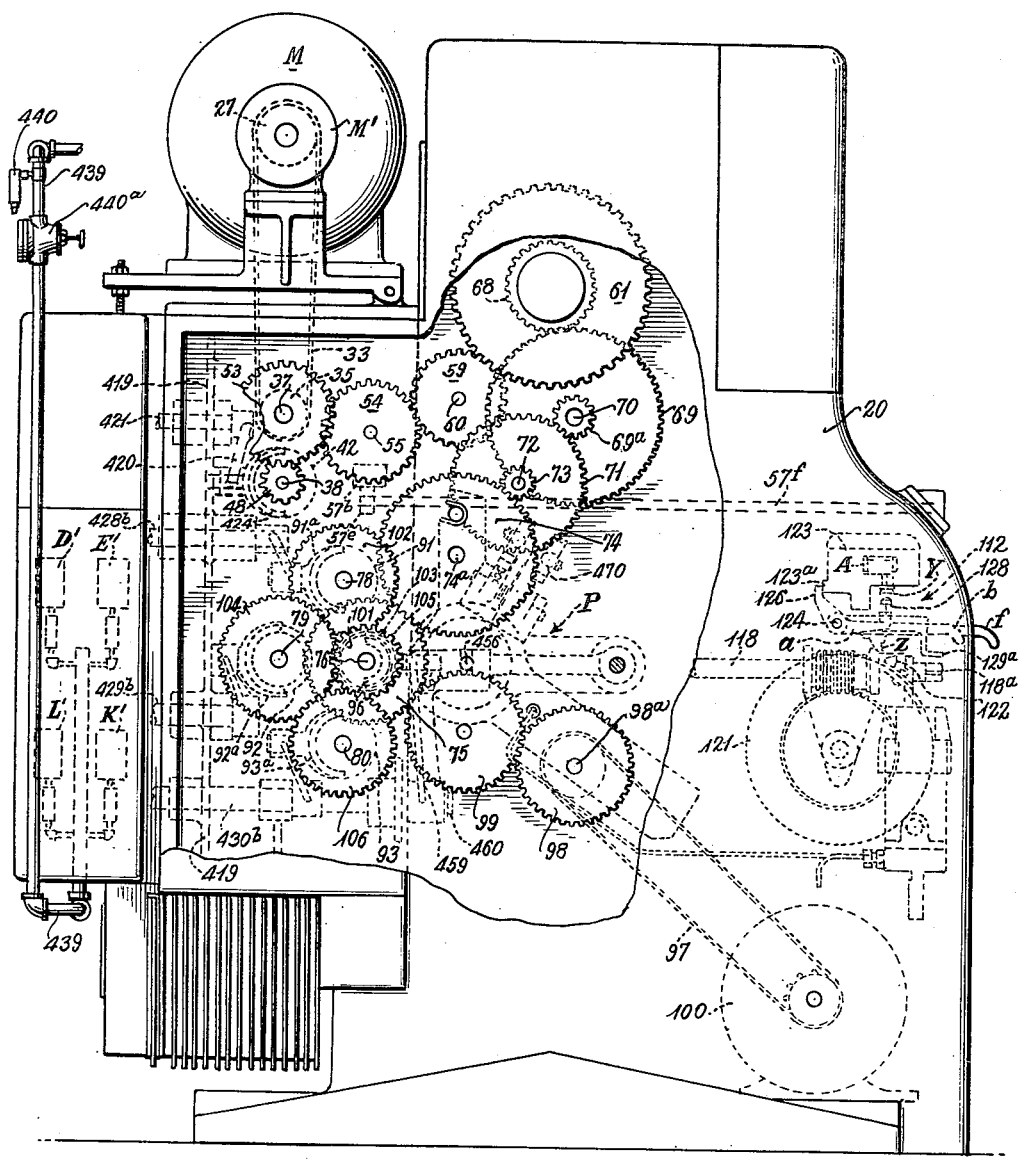

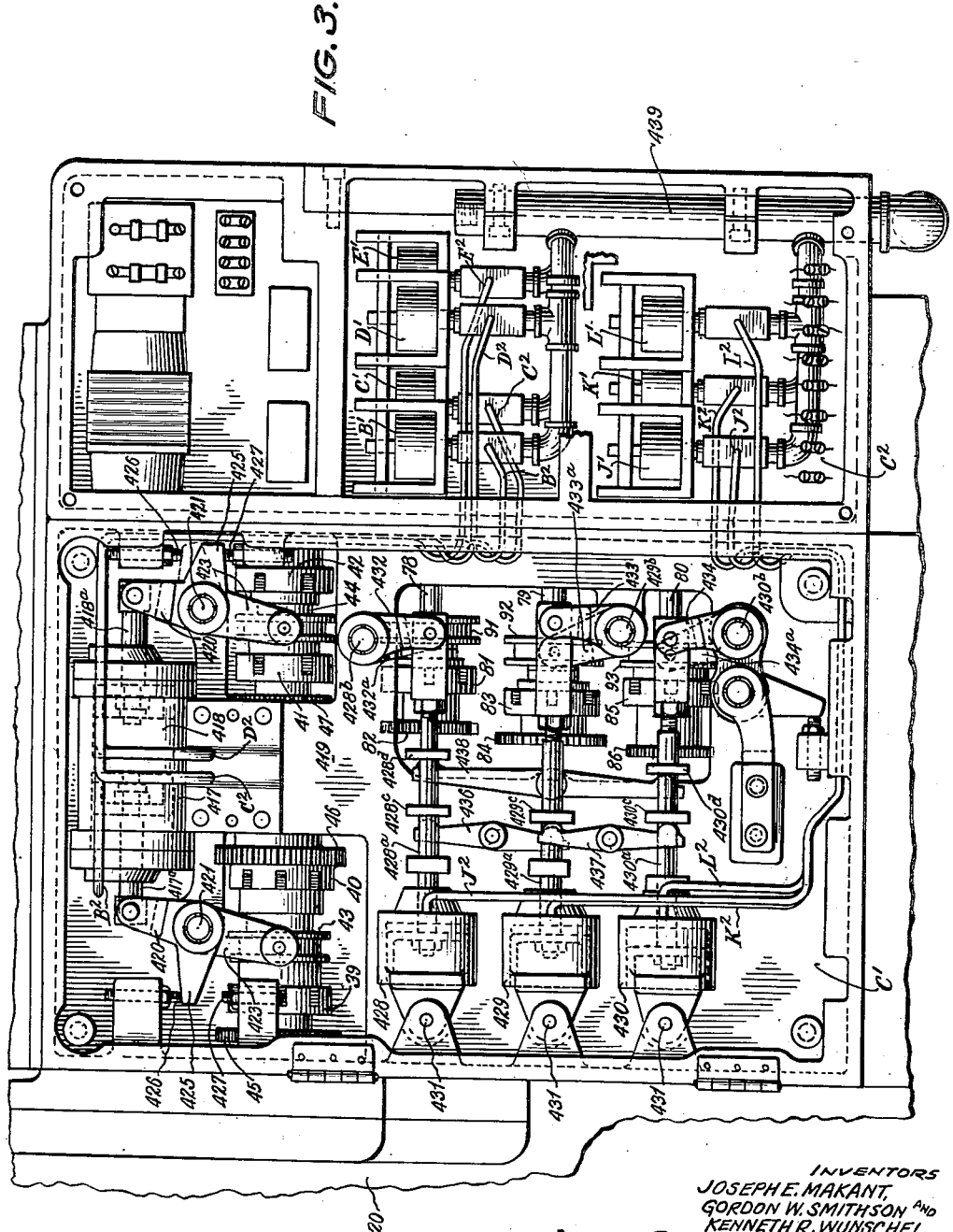

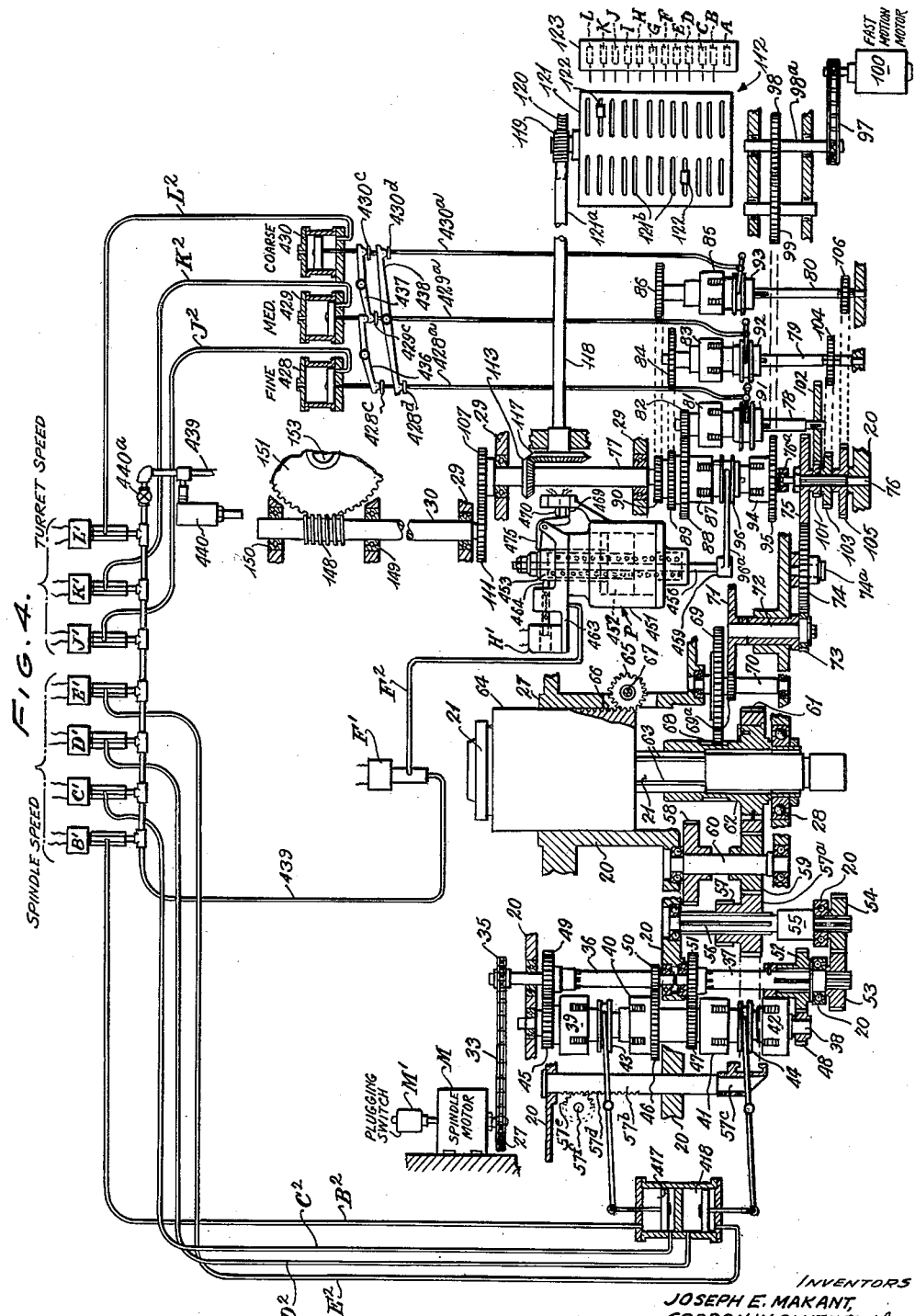

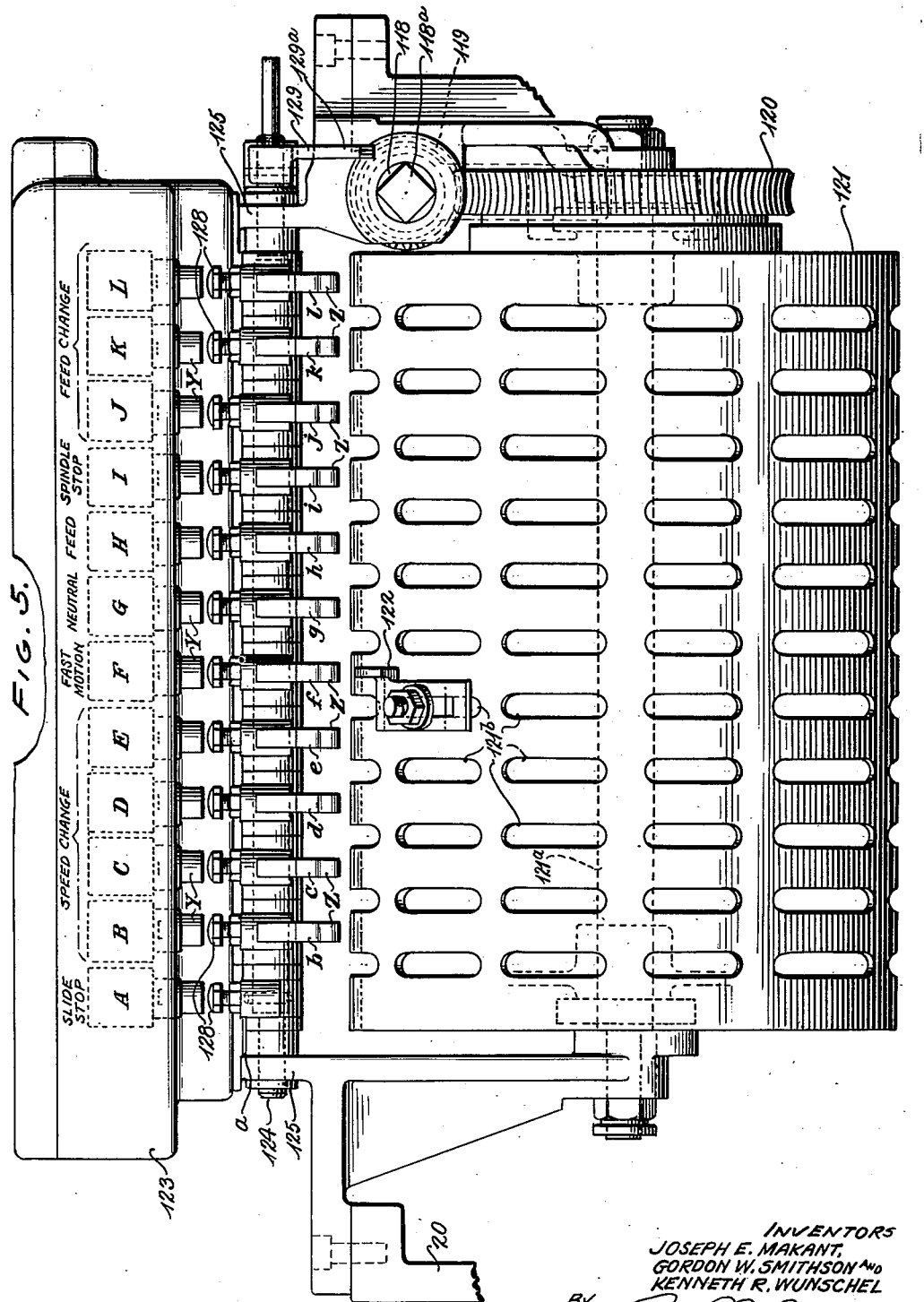

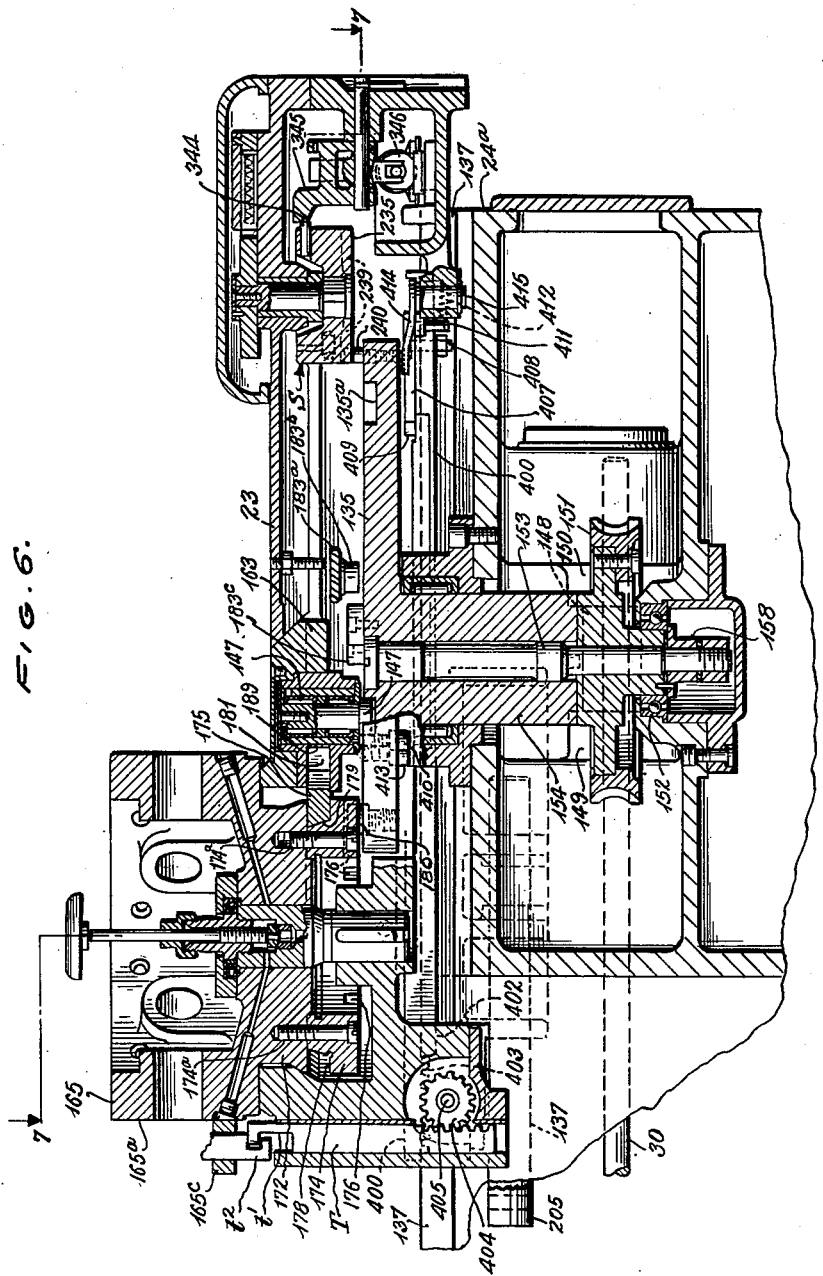

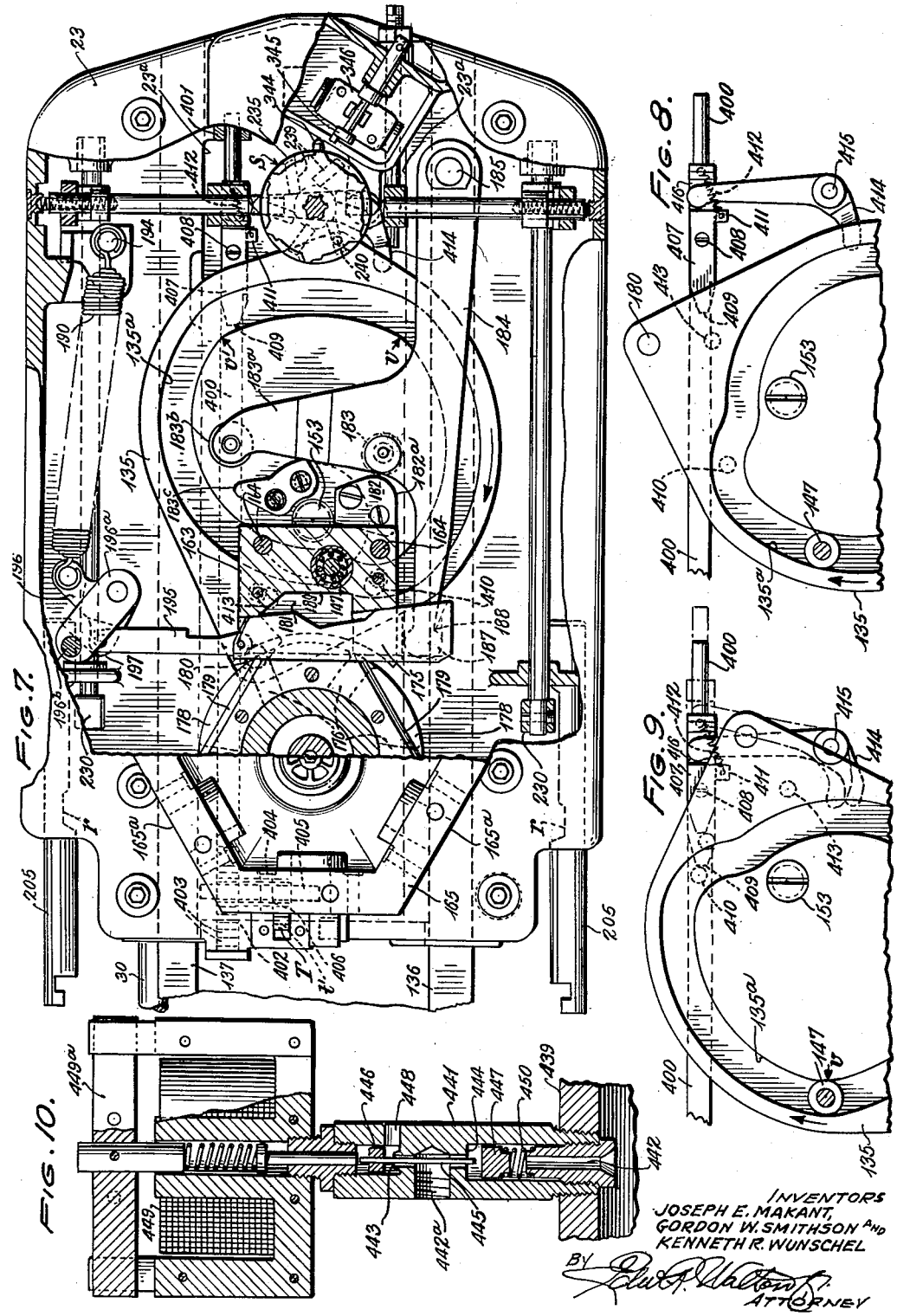

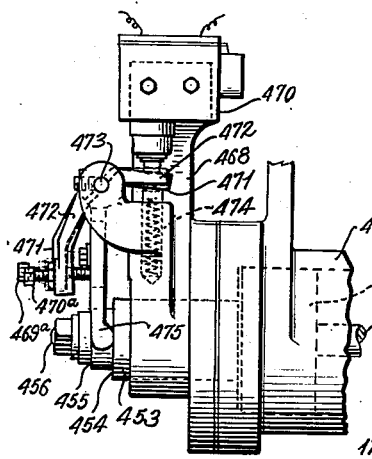
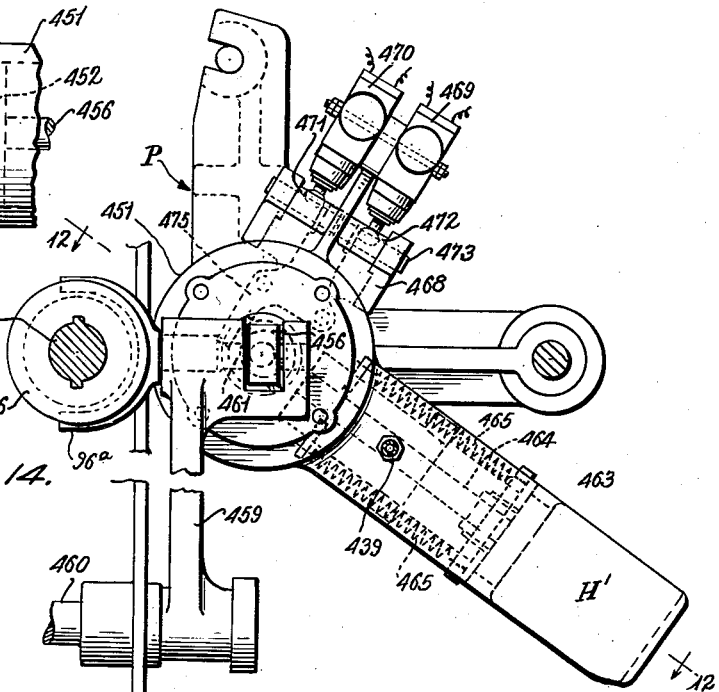
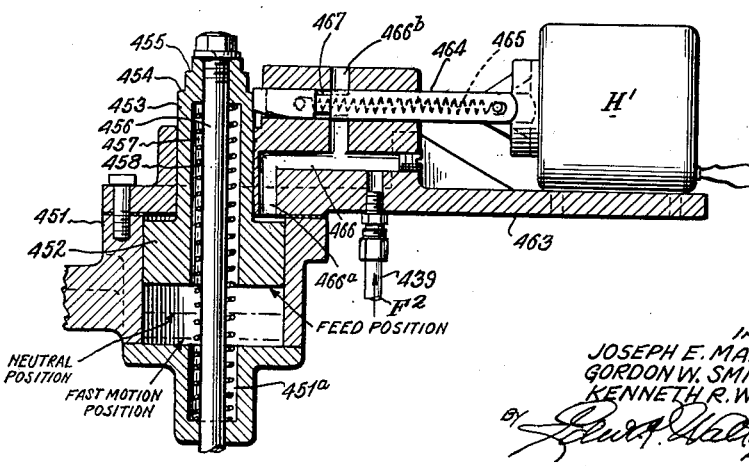

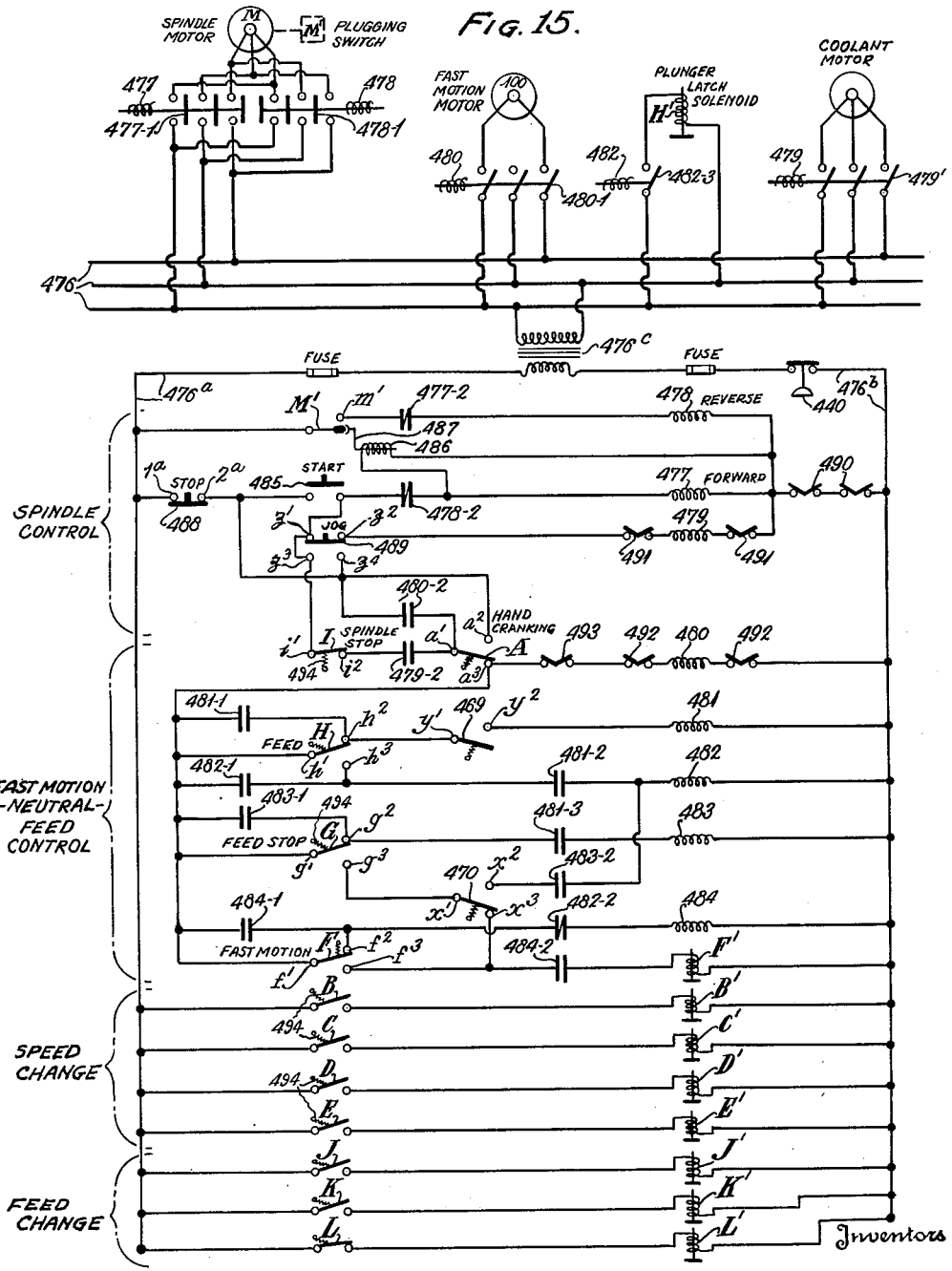

Patented Apr. 29, 1952

UNITED STATES PATENT OFFICE 2,594,782

CONTROL FOR MACHINE TOOLS

Joseph Earle Makant and Gordon William Smithson, Pawtucket, and Kenneth Richard Wunschel, Johnston, R. I., assignors, by mesne assignments, to Niles-Bement-Pond Company, West Hartford, Conn., a corporation of New Jersey Application October 9, 1947, Serial No. 778,774

16 Claims. (Cl. 29—64)

The present invention relates to machine tools and more particularly to fully automatic turret lathes where one of the important considerations in such a machine is to obtain, as quickly as possible, variations in the speed of the spindle and in the feed of the turret-slide or carriage or of the cross-slides. Such quick change of speed and feeds of machine tools has been proposed in U. S. Patent 2,357,396 wherein such variations or changes are accomplished by shifting appropriate clutches by pneumatic pressure which is electrically controlled.

The present invention has for its object the employment of pneumatic mechanism for shifting the clutches of the spindle "speed" and of the turret-slide and/or cross-slide "feed" movements to change the rate of "speed" rotation of the spindle and of the "feed" movements of said slides, the organization and arrangement of said pneumatic mechanism being such as to apply its clutch shifting pressures more directly and quickly to the clutches, thus eliminating many parts in the form of mechanical connections and greatly simplifying the same; and, also, to provide, as a safety feature, a novel and an improved mechanical interlocking means between the pneumatic mechanism for actuating the change-feed clutches so that only one clutch may be engaged at any one time, the arrangement being that if one feed clutch is actuated to engage its clutch, said engaging movement will effect a disengagement of all other change-feed clutches.

Another object of the present invention is the provision, in said pneumatic clutch shifting means, of a novel control mechanism for alternately engaging and disengaging a main-feed clutch and a constant speed fast-motion clutch for effecting feed or rapid movements of the turret-slide; or for stopping either of said movements of said slide.

A further object of the invention is the provision of a novel mechanism for operating slide-tools, carried by the turret slide, from a cam device that also actuates the turret-slide, locks and unlocks the turret and indexes the latter as well as actuates a cross-slide selector, if the latter is employed.

A still further object of the invention is the provision of a novel arrangement for insuring a binding action of the turret locking means after each turret indexing operation.

Also, it is an important object of the invention to provide an electrical control circuit that controls the operations of the electro-pneumatic means from a pre-set dog drum synchronously operated from the output side of said clutches or feed-change mechanism of the turret-slide so that the timed relationship between the slide and the dog drum will not be altered, said electrical control circuit including initiating switches and relays controlling circuits embracing said initiating switches in such a manner that the turret slide may be placed in feeding movement or quick-motion movement alternately, or either of said movements of the slide may be stopped, and, so that when one of the initiating switches is operated, it takes command of the control circuits irrespective of whether a previously operated initiating switch has been released from its initiating position.

The above broadly states the objects sought to be attained by the present invention but other objects and novel features of the invention will be apparent as the description of the invention proceeds.

In the drawings which show the preferred embodiment of the invention as applied to one form of machine tool and as at present devised:

Figure 1 is a perspective view of an automatic turret lathe looking toward the front of the machine and equipped with the present invention;

Figure 2 is an end view of the machine looking toward the head-stock and with the end door removed to show the arrangement and disposition of the shafts and other mechanism disposed within the head-stock;

Figure 3 is an enlarged fragmentary view of the rear of the head-stock with the door and closure plate removed to illustrate the disposition and location of certain shafts, gears and clutches; and, particularly, the disposition of the pneumatic mechanism for effecting change-speed and change-feed;

Figure 4 is a diagrammatic view illustrating the lay-out of the gearing for driving the spindle and turret slide and the disposition of the clutches for automatically changing the spindle "speed" and the "feed" movements of the turret slide as well as the electro-pneumatic mechanism for operating said clutches;

Figure 5 is an enlarged front elevation of the dog drum and the initiating electrical switches operated thereby or which may be operated manually;

Figure 6 is a longitudinal sectional view of the turret slide taken substantially on line 6—6 of Figure 1;

Figure 7 is a plane view of the turret slide taken substantially on line 7—7 of Figure 6;

Figure 8 is a fragmentary schematic showing of the slide tool actuating mechanism operable from the turret operating cam;

Figure 9 is a fragmentary schematic illustration similar to Figure 8 showing the slide tool actuator being operated by the turret operating cam;

Figure 10 is an enlarged vertical sectional view of a solenoid air valve employed in the electro-pneumatic control mechanism;

Figure 11 is an end elevation of the pneumatic mechanism P that operates the clutch slide or cone for placing the turret slide in its feed movements or in fast-motion or for stopping said movements;

Figure 12 is a transverse sectional view taken substantially on line 12—12 of Figure 11 to show details of said pneumatic mechanism P;

Figure 13 is a fragmentary side elevation of one end of the pneumatic mechanism P not shown in Figure 11;

Figure 14 is an elevation of said end of the pneumatic mechanism shown in Figure 13; and Figure 15 is a line diagram of the electrical control circuits of the invention.

The accompanying drawings above mentioned form, by reference, a part of this written description.

The type of machine with which the present invention is illustrated in the drawings is an automatic turret lathe as shown in United States Patent No. 2,455,876, granted December 7, 1948, but wherein the clutch shifting mechanism, as shown in Figures 13 to 21 inclusive of said patent, has been replaced by the present invention and, in addition, several other improvements in the machine, shown in said application, have been made in the turret locking means, and in "slide-tool" operating mechanism, as will appear as this specification proceeds. It is to be understood, however, that the invention is not to be limited to the machine illustrated and described herein but may be applied to any other type of machine to which the invention is applicable.

In order that an understanding may be had of the machine illustrated in the drawings and to which the invention is applied, as one example, it should be stated that the machine shown in Figure 1 of the drawings follows the general organizational pattern of the various instrumentalities found in certain types of automatic turret lathes. Such machine comprises a bed 24 at one end of which is a headstock 20 having a horizontally disposed spindle 21 rotatably journalled therein and having disposed therein the power and variable transmission units of the machine. On the inner end of the spindle and overlying the bed 24 is fixedly secured a chuck 22 in which a workpiece (not shown) may be clamped in the usual manner. Mounted on the bed 24 for reciprocable sliding movement longitudinally of the bed and parallel to the axis of the spindle 21 toward and away from the chuck 22 on the spindle 21, is a turret slide or carriage 23; and, also mounted on the bed 24 and disposed between the chuck 22 and the carriage 23, are front and rear cross slides 25 and 26, respectively, which may be operated independently or simultaneously to reciprocate at substantially right angles with respect to movement of the turret slide or carriage 23 and in cooperative relation with a workpiece that may be held on the chuck 22.

With particular reference to Figures 1, 2, 3 and 4, the headstock includes an outer casing for power plant motors, transmission mechanism, including its clutches, the electro-pneumatic mechanism for shifting the clutches, the electrical control mechanism, as well as to provide bearings 27 and 28 for the spindle 21 and a bearing 29 for the feed shaft 30.

The upper portion of the base 24 provides a table-like member 24ª upon which are mounted turret slide 23 and the cross slides 25 and 26, the mechanism for operating said turret slide, which includes the cam disc 135, shaft 154 and worm wheel 151, being disposed respectively above and below the table 24ª and being driven by the worm 148 fast on the feed shaft 30.

The spindle 21 is driven by constant speed motor M connected by a sprocket chain 33 passing over sprocket wheel on the motor shaft and a sprocket wheel 35 fast on the rotatable shaft 36.

*Headstock*

Referring particularly to Figure 4 it will be seen there are two axially aligned shafts 36 and 37 mounted in suitable bearings in the headstock frame 20, the shaft 36 being, what may be termed, the speed input shaft and the shaft 37 being the speed output shaft. Also journalled in the headstock 20 in cooperative relation and parallel with the aligned shafts 36 and 37 is a rotatable counter-shaft 38 which has rotatably mounted upon it four clutches 39, 40, 41 and 42 arranged in two opposing pairs, each pair being served by a single sliding part or cone, respectively—for instance, clutch heads 39 and 40 being served by the clutch cone 43 and the clutch heads 41 and 42 being served by the clutch cone 44—thus, when the clutch cones 43 and 44 are engaged with any one of their clutch heads, the other clutch head of each pair is disengaged. The clutches may be of any suitable type although, in the present showing, disc-clutches are illustrated. The sliding parts or cones 43 and 44 are splined on the shaft 38 and are shifted by suitable yokes, as can be seen more particularly from Figure 4. Each of the clutch heads 39, 40, 41 and 42 have fast therewith gears 45, 46, 47 and 48, respectively, of different sizes to effect the automatic change of speeds desired. The gears 45 and 46 of clutch heads 39 and 40 mesh, respectively, with their mating gears 49 and 50 fast on the speed input shaft 36 while the gears 47 and 48 of clutch heads 41 and 42 mesh with their mating gears 51 and 52 fast on the speed output shaft 37. With this arrangement, to obtain the four automatic change speeds, the operation of the clutches is as follows:

1. To obtain the lowest speed of spindle operation, clutch cone 43 engages clutch head 40 and clutch cone 44 engages clutch head 42. With the parts in this position the drive from gear 35 is through shaft 36, gears 50 and 46 to shaft 38 which rotates gear 48 meshing with gear 52 fast on speed output shaft 37;

2. In order to obtain the second speed of spindle operation, clutch cone 43 remains engaged with clutch head 40 but cone 44 disengages clutch head 42 and engages clutch head 41, the drive then being from speed input shaft 36 through gears 50, 46, shaft 38, gear 47, gear 51 to speed output shaft 37;

3. To secure the third speed of spindle operation, clutch cone 43 engages clutch head 39 (thereby disengaging clutch head 40) and clutch cone 44 engages clutch head 42, if not already in engagement therewith, whereby the drive is from input speed shaft 36 through gears 49, 45, shaft 38, gears 48 and 52 to speed output shaft 37; and 4. To obtain the fourth and highest speed of spindle operation, the clutch cone 43 engages in clutch head 39, if not already in engagement therewith, and the clutch cone 44 is moved in engagement with the clutch head 41, whereby the drive is from speed input shaft 36, gears 49 and 45, counter-shaft 38, gears 47, 51 to speed output shaft 37.

From the above it will be observed that, during these four automatic speed changes, one of each pair of clutch heads with their mating gears are always engaged while the other two clutch heads with their mating gears run idle on the counter-shaft 38 and that any combination of two clutches may be engaged simultaneously within the limitation, of course, that when one clutch of a pair is engaged the other clutch of the same pair is disengaged which is a feature of safety as will appear later from the description of the clutch operation mechanism.

The spindle drive continues from the speed output shaft 37 through hand-change gears 53 and 54 to shaft 55. These hand-change gears are, respectively, fast on the outer ends of the shafts 37 and 55 so as to be accessible, as shown in Figure 2, for quick manual change through a suitable door in the end wall of the headstock casing 20 may be provided in groups to obtain different ranges of speeds in a manner and for a purpose well known in the art.

From shaft 55 the machine may be converted from a low speed to a high speed machine, and conversely, but always influenced by the speed changes which are effected by the hand-change gears 53 and 54 and through the automatic clutches just described. By providing shaft 55 with multiple splines 56 on which a double gear 57 and 57ª slides and by moving the double gear 57 and 57ª manually so that either the low speed gear 57 will mesh with its mating gear 58 or the high speed gear 57ª will mesh with its mating gear 59, such change-over may be effected. The double gear 57—57ª may be shifted by a bar 57ᵇ slidably mounted in bearing openings in the headstock frame 20, having a yoke 57ᶜ on one end and rack teeth 57ᵈ in engagement with a gear 57ᵉ fast on a shaft 57ᶠ which extends through the front wall of the headstock casing 20 to receive the end of a socket wrench or crank.

It will be observed that gears 58 and 59 are keyed to a jack-shaft 60 and that gear 59 is in mesh with a gear 61 keyed to a sleeve bearing 62 in which the rear end of the spindle 21 is splined at 63 for longitudinal adjustment therein. The sleeve bearing 62 is journaled at 28 in the headstock casing 20, as is the shaft 55 and the jack shaft 60, in suitable ball bearings.

The front or chuck end of the spindle 21 is journaled in a bearing sleeve 64, which latter is slidably mounted in a bearing 27 on the casing 20 for longitudinal movement in order to provide the adjustment of the spindle 21 longitudinally to or from the slide 23 or a turret face on said slide. This adjustment may be accomplished by the provision of a pinion 65 journaled on the headstock and engaging a rack 66 on the spindle sleeve 64, the pinion being operated through a shaft 67 having a squared end extending through the headstock casing 20 (see Fig. 1).

*Feed shaft drive*

The drive for the feed shaft 30 (which actuates the turret slide 23 and cross slides 25 and 26) is connected directly with the spindle 21 so that the feed will always be in ratio per revolution of the spindle. This feed drive is taken off of the spindle sleeve 62, which has teeth 68 cut therein meshing with a gear 69. The gear 69 is keyed to a jack shaft 70 which has a spur gear 69ª fast thereto for driving gear 71 keyed to one end of a stub shaft 72 which also has gear 73 fast thereon to drive gear 75, through the intermediate gear 74. The gear 75 is keyed to an input speed shaft 76 which is aligned with and rotatably independent of an output speed shaft 77 for the feeding movements to the turret-slide 23 and the cross-slides 25 and 26.

From this input shaft 76, various feed changes may be obtained through the medium of hand-change gears for the tool slides as well as three automatic feed changes of any selected feed obtained by the hand-change gears. As shown in Figures 2 and 4, three separate and independent countershafts 78, 79 and 80 are grouped about the aligned input and output shafts 76 and 77 and suitably journaled in the housing 20. Each of these countershafts 78, 79 and 80 has rotatably mounted thereon a clutch head 81, 83 and 85, respectively, each clutch head having a mating gear 82, 84 and 86 fast thereon, respectively, which gears are of different sizes, and mesh, respectively, with a cluster gear fast to a main feed clutch head 87 rotatably mounted on the output speed shaft 77. The cluster gear comprises three gear members 88, 89 and 90 which are in constant mesh with gears 82, 84 and 86, respectively. Also, each of said countershafts 78, 79 and 80 has a sliding clutch part or cone 91, 92 and 93, respectively, splined thereon for reciprocating into and out of engagement with the clutch heads on said countershafts.

The output shaft 77 has a quick return clutch head 94 rotatably mounted thereon and carrying with it a mating gear 95. The clutch head 94 is in opposed cooperative relation with the main feed clutch head 87 so as to be served by the clutch slide or cone 96 splined on the shaft 77, whereby one of the clutch heads 87 or 94 will be engaged when the other is disengaged or both disengaged when the cone is in a neutral position. The quick return clutch head 94 is for connecting the shaft 77 with the motor 100 for effecting quick idle motions of the tool slides 23, 25 and 26 and, to this end, its mating gear 95 is driven from the motor 100.

The counter-shafts 78, 79 and 80 are driven from the input shaft 76 through hand-change gears (101—102, 103—104, and 105—106 respectively) splined on the ends of said shafts so that they can be readily removed manually through a suitable opening in the casing 20 to effect various ratio combinations of speeds between the input shaft 76 and said counter-shafts in a manner well known in the art. With the selection of hand-change gears shown, the fine or first feed counter-shaft 78 of the feeding mechanism is driven by gears 101 and 102; the second or intermediate feed counter-shaft 79 is driven by gears 103 and 104; and the third or coarser feed counter-shaft 80 is driven by gears 105 and 106, all, as above stated, are hand-change gears well known in the art.

The three automatic changes of speed of feed of the tool slides are obtained in the following manner:

1. For fine feed of movement of the tool slides and all of the clutch cones 91, 92 and 93 being out of engagement with their respective clutch heads, the clutch cone 91 is moved into clutching engagement with the clutch head 81 and cone 96 is moved into engagement with main feed clutch head 87, thus the drive being from input shaft 76 through hand-change gears 101, 102, shaft 78, clutch head 81, gears 82, 88, and main feed clutch head 87 to output shaft 77. It may be noted here that the clutch cone 96 is in engagement with the main feed clutch head 87 during all feeding operations and is only moved out of engagement therewith when it is desired to effect the quick idle movements of the tool slides or when the feed mechanism is hand operated for "setting-up" or the machine stopped;

2. For the second or intermediate feed of the tool slides, and cones 91 and 93 being disengaged from their respective clutch heads, the cone 92 is moved in engagement with clutch head 83, thus the drive being from input speed shaft 76, through hand-change gears 103, 104, shaft 79, clutch head 83, gears 84, 89, and main feed clutch head 87 to output shaft 77; and 3. For the third or coarse feed of tool slides and with the clutch cones 78 and 79 disengaged from their respective clutch heads, clutch cone 93 is moved into engagement with clutch head 85, thus the drive being from speed input shaft 76 through hand-change gears 105, 106, shaft 80 clutch head 85, gears 86, 90, and main feed clutch head 87 to output shaft 77.

As will be seen hereinafter, the mechanism which operates the clutch cones 91, 92 and 93 is to be interlocked so that, when any one of the three clutch cones is operated to engage its clutch head, they automatically disengage any other of said clutch cones that was previously in engagement, this being a safety feature which permits only one of the three feed clutches to be engaged at one time while the other clutch heads and their mating gears run idle on their respective shafts. Also, the counter-shafts 78, 79 and 80 are rotated continuously from the input shaft 76 through their aforesaid respective hand-change gears while the machine is in operation.

The fast motion of the tool slides 23, 24 and 25 (that is, their idle motion from the time that any tool then in operation has finished cutting and is brought back to clear the subject being machined, the turret indexed, and then moved forward to bring the next set of tools to the subject) is obtained by means of the fast motion motor 100 through sprocket chain 97 trained over pinions on motor shaft and shaft 98ᵃ to drive meshing idler gears 98 and 99, which latter meshes with mating gear 95 of fast motion clutch head 94. The motor 100 runs at constant speed continually during the operation of the machine and when the fast motion clutch head 94 is engaged automatically by clutch cone 96, thereby disengaging the main feed clutch 87, "fast motion" is imparted to output shaft 77. When the tools of the turret slide 23 and/or the cross slides 25 and 26 are again in position for cutting operations on the work-subject, the quick return clutch 94 is disengaged and the main feed clutch 87 is engaged by the cone 96 whereby shaft 77 is again brought to feeding motion. When "fast motion" is in operation, cluster gear 88—89—90 runs idle on shaft 77 and shaft 76 runs idle in the end of shaft 77, as shown at point 76ᵃ.

From output shaft 77, "feed" or "fast motion" is transmitted to the feed shaft 30 (which operates turret slide 23 and cross slides 25 and 26) through gear 107 fast on shaft 77 and meshing with gear 111 keyed on feed shaft 30.

The operations of the machine are automatically controlled by an improved control device, generally indicated, 112 disposed at and within the front portion of the head stock casing 20, see Figs. 1 and 2. This control device is driven by beveled gear 113 fast on shaft 77 and meshing with beveled gear 117 keyed on worm shaft 118 and, through worm 119 also keyed on shaft 118, drives worm gear 120 secured to one end of a dog drum 121 which is freely journaled on a supporting shaft 121ᵃ. Thus, the timing between the dog drum 121 and the feed shaft 30 will not be altered. The control device comprises, in part, the dog drum 121 (Figs. 1, 2 and 5) provided on its peripheral surface with a multiplicity of parallel circumferentially extending slots in which may be adjustably fastened dogs 122 arranged to operate electrical contact switches positioned on a bar or casing 123 disposed above the dog drum. The switches are arranged in a row extending longitudinally of the periphery to the dog drum and are twelve in number for the purposes of the machine illustrated in the drawings and are designated A to L inclusive. There are eleven circumferential rows of slots 121ᵇ in the dog drum to serve eleven of those switches—i. e., switches B to L inclusive. Switch A is provided as a safety feature for cutting off all automatic power driven motion to the tool slide when hand cranking. The switch I automatically or manually stops the rotation of the spindle as when it is desired to jog the machine for setting-up purposes. The remainder of the switches operate electro-pneumatic valves for shifting clutches (or other speed change mechanism) that change the spindle "speed" or rotation of the "feed" or sliding movement of the turret slide and the cross slides during cutting operation as well as to effect the quick-idle slide movements of the slides or to stop the movement of said slides entirely except as may be accomplished by hand cranking of the machine.

The switches B to L are actuated by the dogs 122 through the medium of interposed levers $b$ to $l$ respectively there being one of these levers for each of the switches, and arranged to cooperate with their correspondingly designated switches in upper case characters. These levers extend transversely of the dog drum and are rotatably mounted on a shaft 124 journaled in the brackets 125. The rear ends 126 of the levers (Fig. 2) project beyond the shaft 124 to engage the back of the switch bar 123ᵃ, which acts as a stop, and the forward portion of the levers are heavier and extend at least to an elongated hand-hole 127 (Fig. 1) in the forward wall of the head stock 20, where they may be manually engaged to be lifted up from normal position for operating any one of the switches $b$ to $l$. For purposes of convenience the levers $f$, $g$ and $h$ protrude beyond the hand-hole 127. The lower edge of each of these levers, $b$ to $l$ inclusive, is provided with a depending lug Z and positioned to lie in the path of a dog 122 applied to the drum to lift said levers, respectively, so that the adjustable contacting head 128 will engage the spring loaded plunger Y of their respective switches.

As shown in Figures 1, 2 and 5, the worm shaft 118 is provided on its outer extremity with a square end 118ᵃ to receive a hand-crank, or other implement, for hand-cranking the machine for "setting-up" purposes as is well understood in the art. When hand-cranking, it is desirable as a safety measure that the fast motion motor 100 be de-energized. The switch A is a slide stop motion or cut-out switch for all automatic operations of the tool slides and has its spring-loaded plunger arranged to be engaged by the adjustable contacting head 128 of the lever-arm $a$ fast on the shaft 124 to depress said plunger against its bias. The end of the shaft 124 adjacent shaft 118 has fast thereon a lever-arm 129 which has its free end portion 129ª lying normally in a position to obstruct the insertion or application of a tool or implement to the square end 118ª for effecting hand-cranking unless the free end of the lever-arm 129 is manually lifted, which rotates shaft about its axis and lifts lever-arm *a* to depress the plunger of switch A to operate said switch.

*Tool slides*

As above stated, all movements of the main or turret slide 23 and of the cross-slides 25 and 26 are actuated from a single disc-cam 135 driven from the feed shaft 30 having worm 148 fast thereon and meshing with worm gear 151 fast on the arbor 154 of said disc-cam, which latter also unlocks the turret, indexes the turret 165, if one is employed, actuates a cross-slide preselector device S that renders effective and ineffective the connection for operating the cross-slides 25 and 26 from the movement of the main or turret-slide 23 (see Figures 1, 4, 6 and 7), all as more particularly shown and described in the copending application above mentioned.

The present invention, however, embodies the improvements, over the disclosures in the aforesaid copending application, namely (1) for positively forcing the turret lock-bolt 175 back to locking position to effect an accurate indexed position of turret and positive binding locking or clamping of the turret in indexed position, which has a marked effect on the accuracy of the work produced by the machine; and (2) a "slide-tool" operating device—all actuated from the same disc-cam 135 in addition to its other function as mentioned in the preceding paragraph.

The main or turret slide 23 is of a hollow flat box-like formation with a relatively wide central longitudinal slot 23ª on its bottom side. The marginal edge portions of the slot 22ª are offset to form channels slidably resting upon track-ways 136 and 137 upon which the slide 23 is reciprocated to and fro with respect to the chuck 22 by the horizontally disposed disc-cam 135 positioned within the slide 23 and above the ways 136 and 137. The cam 135 is provided with a substantially heart-shaped box-cam groove 135ª on its upper surface and a cam roll or follower 147, carried on the under face of the top wall of the slide 23, extends into said cam groove 135ª, the cam 135 rotating in the direction of the arrow shown in Figure 7.

The disc-cam 135 makes one revolution for each full reciprocatory movement of the slide 23— i. e., from its rear starting point (when the turret 165 is indexed) forward toward the chuck 22 and back to its starting point. The slide 23 is shown in Figures 1, 6 and 7 in its rear or starting point position and just after the turret has been indexed and locked into position by the wedge-lock-bolt 175.

The turret 165 has vertically disposed polygonal tool-carrying faces and has a depending hub 172 rotatably mounted about a vertical axis in the forward end of the main slide 23, the tool-carrying faces extending above the slide 23 to oppose the chuck 22. Applied to the lower end of the hub 172 is an index and lock disc-plate 174, in the form of an annulus, secured by bolts 174ª. The under surface of the disc-plate 174 is provided with a plurality of grooves 176, one for each face of the turret and arranged in a somewhat radially offset, as indicated by dotted lines in Figure 7, to receive an indexing pin 180 on the disc-cam 135—after the manner of a Geneva movement—for indexing the turret. The upper surface of the disc-plate 174 is reduced in diameter to provide a circular groove 178 underlying the hub 172 and with the perimetral surfaces of the reduced portion formed polygonally, as at 179, to correspond with the number of and the position of the turret faces. The polygonal surfaces 179 are upwardly and inwardly inclined to be engaged by a corresponding surface on the wedge-lock-bolt 175.

The wedge-lock-bolt 175 is supported in a horizontally slotted or bifurcated front face 181 of the guide-block 163 with the bottom wall or crotch of the slot oblique, as indicated in Fig. 7 of the drawings, to provide a wedge slot so that the wedge-bolt 175 slides into such slot longitudinally thereof and transversely of the machine and under the action of a biasing spring 190 to locking position its straight chambered forward edge will bear against the complemental chamfered surface 179 on the disc-plate 174, the opposite edge of wedge-bolt 175 being formed complemental to the bottom wall of the wedge slot 181.

At a point in the rearward return movement of slide 23 and before it reaches its rearmost position, the disc-cam 135 moves plate-cam 182, mounted on its upper surface, into engagement with roller 183 carried by lever 184 to swing the lever 184 counter-clockwise with respect to Figure 7, thus withdrawing the wedge-lock-bolt 175 against the tension of the spring 190 to release the turret 165 for indexing. The lever 184 has one end fulcrumed at 185 to a rear portion of the slide and its other end formed with a radius extremity 187 extending into a correspondingly forward slot 188 at one end of the back bolt 175.

When the bolt has been so withdrawn the indexing pin 180 will have been moved to enter one of the indexing grooves 176, which groove has been brought to position to receive the indexing pin 180 by a previous indexing of the turret. Having entered the groove and continued in its movement with cam-disc 135, the pin 180 has indexed the turret 165 one position or face and is shown in Fig. 7 as now leaving said groove.

During this indexing of the turret 165, the cut-out portions 189 of the guide block 163 and the cut-out portion 189ª of the wedge-lock-bolt received complemental portions of said lock-bolt and guide block, respectively, thus providing sufficient clearance to allow indexing of said turret.

After the indexing pin 180 has substantially completed the indexing of the turret, the dwell 182ª on the plate cam 182 releases the arm 184 to allow the biasing spring 190 to draw the wedge-lock-bolt 175 and snap it into the position shown in Fig. 7 where it wedges itself between the oblique bottom surface of slot 181 and the opposing chamfered surfaces 179 on the disc-plate 174 secured to the bottom of the turret.

As before stated, an improvement of the present invention over the aforesaid copending application, resides in arrangement of the biasing device 190 and in means on the disc-cam 135 for positively wedging the wedge-lock-bolt 175 in its turret locking and binding position after having been preliminarily brought to that position by said biasing device 190.

To this end and referring to Fig. 7, the spring 190 is disposed within the slide 23 along its rear or back side and has one end anchored thereto by a stud 194 while its other end, adjacent the wedge-lock-bolt 175, is connected to one end of a bell-crank lever 196 of a compensating toggle. The other end of the bell-crank lever 196 is pivoted to the wedge-lock-bolt 175, as at 197, by a link 195. The compensating toggle further comprises a link 196$^a$ pivotally connected to intermediate elbow portion of the bell crank lever 196 and pivotally supported by a pin or bolt 196$^b$ fixed on the under surface of the top-wall of the slide 23. This compensating toggle, biased by the spring 190, produces a very effective snap action on the wedge-lock-bolt 175 in returning it to lock position. Under certain machine operating conditions, the action of the spring 190 alone is inadequate to accomplish both the accurate location and binding of the turret 165. To overcome this situation the intermediate arm 183$^a$ on lever 184 and which carries the cam roller 183, is extended laterally across the disc-cam 135 to have its free end lie on the other side of the axis 153 of said disc-cam 135. This free end of the arm 183$^a$ carries a cam roll 183$^b$ which is engaged by a lug-cam 183$^c$, adjustably secured to the top surface of the disc-cam 135, after the spring 190 has returned the wedge 187 to its turret locating and binding position, and thus exerts a pressure on the lever 184, which tends to move it in a clockwise direction in Fig. 7 and causes its radius extremity 187 to exert a squeezing action on the wedge-lock-bolt 175 to positively seat the latter and accurately locate and bind the turret 165 in position.

At or about the same time the turret 165 is indexed, a pin 240 on the disc-cam 135 enters in one of a plurality of radial indexing grooves 239 in the undersurface of an indexible wheel 235 of a cross-slide selector S, which may be rendered effective, according to the manner the selector has been "set-up" for a particular production operation, any one or both, or neither, of the cross-slides 25 and 26, as is fully shown and described in said Patent No. 2,455,876. It will suffice to say that latch members 230, controlled by the selector S, engage or disengage keepers $r$ on push-rods 205 which actuate said cross-slides from the to-and-fro movement of the turret slide 23. Also, upon each revolution of the selector S, a lug 344 on the disc 235 oscillates a crank 345 of a lubricating pump 346.

After the turret has been indexed and locked and the proper selection of the cross-slides has been made, the slide 23 is actuated by the disc-cam 135 with quick or fast motion from motor 100 through clutch 94, shaft 77 and shaft 30 toward the chuck 22 until the tools (not shown) on the turret face are about to contact the work-piece (not shown) held by the chuck. At this time a dog 122 on dog drum 121, acting through means later to be described, shifts clutch cone 96 disengaging quick motion clutch 94 and engaging main feed clutch 87, thus actuating the slide 23 of slow cutting feed movement until that cutting operation has been performed. It is, of course, understood that the cycle of operation of the machine is governed by the number of faces of the turret 165 or by the number of such faces as may be employed for any operation upon a workpiece according to the "setup" of the machine, for instance, the machine may be equipped with a "skip face" mechanism not shown. Consequently, at the end of each forward feeding motion of the turret slide 23, when the slide follower 147 is in the dwell portion ($v$—$v'$) of the cam-groove 135$^a$ of disc-cam 135, a vertically movable "slide-tool" actuator T is operated, which is mounted on the forward end of the turret slide 23. The mechanism for operating this actuator T is another improvement of this invention.

A "slide-tool" actuator T employed on most of the automatic chucking-turret-lathes consists of a slidably mounted bar having a notched upper end $t^1$ which interengages with a similar or complemental notch member $t^2$ of the slide-tool device 165$^c$ (partially shown in Fig. 6) secured to any selected face of the turret 165. Therefore, any face of the turret 165 carrying such a slide tool and when indexed to operative position, the member $t^2$ of the slide-tool will interengage with the end $t^1$ of the actuator T. These slide tools are usually employed for grooving and internal recessing on the workpiece. Vertical movement is imparted to the slide-tool actuator T by a bar 400 disposed within the slide 23 below the disc-cam 135 and extending longitudinally of the turret slide 123 between the axis 153 of said disc-cam 135 and the way 137. The rear end of the bar 400 is reduced and slidably mounted at 401 in a bearing formed on the turret-slide 23. The forward end of the bar 400 is similarly slidably mounted at 402 in a bearing formed in the turret slide 23 and is provided with a series of rack-teeth 403 which mesh with an elongated pinion 404 whose axis is journalled in bearings on the turret-slide as at 405. The actuator T is also formed with rack teeth 406 which mesh with pinion 404. (See Figures 6 and 7.)

Disposed adjacent the rear end portion of the rod 400 and on the top surface thereof is a flat elongated abutment plate 407 pivoted intermediate its length to said bar on a vertically disposed pin 408 fast in said bar. The forward end 409 of the latch member 407 may be beveled, as shown, to be engaged by a pin 410 depending from the underside of the disc-cam 135 to shift the bar 400 rearwardly, which motion is transmitted by the pinion 404 to the slide-tool actuator T to move the same vertically and, thus, actuate the slide-tool. The abutment plate 407 is formed at a rear corner portion with a depending lug 411 which abuts the adjacent side of the bar 400 to prevent swinging movement of the abutment plate 407 when it is engaged by the pin 410 in the manner just described, the abutment plate 407 being normally biased to the position shown in Fig. 7 by a spring 412 having one end connected with the lug 411 and the other end anchored to the bar 400.

The bar 400 is returned to its position shown in Figs. 6 and 7 by a pin 413 projecting from the underside of the disc-cam 135 and which pin will engage the free end of the bell crank lever 414 pivoted at 415 to an extension projecting from the sump wall of the pump 344. The other end of the lever 414 extends between confining shoulder formed by a recess 416 in the bar 400. When the free end of the bell crank lever 414 is contacted by the pin 413, it will rotate the bell crank lever on the pivot 415 in a counter-clockwise position and return the bar 400 to its full line position shown in Figs. 6 and 7, and thus move the slide-tool actuator T downwardly to its original or starting position.

When viewing Fig. 7, it may not be readily apparent that the pin 410 would ever contact the latch member 408 or the pin 413 would ever contact the lever 414. In this connection it must be realized that the axis 153 of the disc-cam 135 is fixed in relation to the longitudinal movement of the turret slide 23 which carries the bar 400. By referring to Fig. 8 it will be observed that, before the cam follower 147 approaches the dwell in the cam groove 135, pin 413 passes in forward end 409 of the abutment plate 407; but just as cam follower 147 enters the cam dwell at *v* (see Figure 9) the turret slide 23 is then in its position nearest the chuck 22 and pin 410 will contact the end surface 409 of the abutment plate 407 and push the bar 400 rearwardly for a distance and for a duration sufficient to effect the operation of the slide tool actuator T. By further reference to Fig. 9, it will be observed that, when the bar 400 has been pushed rearwardly to the limit of its distance by the pin 410, it will assume a position indicated in dotted lines and the free end of the lever 414 will have been swung into the path of the pin 413 and will be contacted by pin 413, after pin 410 passes by the abutment plate 407, and thus impart a counter-clockwise motion to the lever 414 and return the bar 400 to its original initial position.

The abutment plate 407 is pivoted in the manner above described so that, if the machine is hand-cranked backwards that either of the pins 410 or 413 come in contact with the forward end of the abutment plate 407, said abutment plate will swing clockwise on its pivot 408 thereby averting any jamming which would otherwise occur, the relative movement of said pins and of the turret slide 123 being such that the pins would only strike the abutment member 407 forward of the pivot pin 408.

Control mechanism

From the above, it should be clear, particularly from Figure 4, that by clutch cones 43 and 44 selectively engaging their respective clutch heads 39—40 and 41—42, four automatic speed changes of the spindle 21 are effected, that by clutch cones 91, 92, and 93 selectively engaging their respective clutch heads 81, 83 and 85, three automatic changes in the feed movement are effected for cutting operations of the turret slide 23 and the cross slides 25 and 26 and that, by clutch cone 96 alternatingly engaging its clutch heads 87 and 94, movements will be transmitted to said slides and the slides will be moved at their feeding rate or in rapid motion from the quick or rapid motion motor 100, respectively, or, when the clutch cone 96 is in intermediate or neutral position, all automatic motion is disconnected from the said shaft 30 and the dog drum 121, and, consequently, from the tool slides 23, 25 and 26. It will be understood that a cycle of the machine embraces an operation where the turret slide 23 has reciprocated back and forth relative to the spindle a number of times corresponding to the number of faces on the turret 165 or to the number of faces that have been brought to indexing position for the tools thereon to perform work on a given subject work-piece. The operation of the clutches, just mentioned, is attained by the electro-pneumatic mechanism schematically shown in Figures 4 and 15 and more particularly shown in its arrangement and organization in the present machine in Figures 1, 2, 3 and 10 to 15 inclusive.

The electropneumatic mechanism, for actuating the speed - change and feed - change clutches, includes air cylinders 417, 418, 428, 429 and 430 disposed in a compartment C' at the rear of the headstock 20 and arranged adjacent the clutches which they actuate; and to one side of the air cylinder compartment c' is another compartment $c^2$ in which are disposed the solenoid air-valves for said cylinders, as shown in Figures 2 and 3. An important feature of the present invention is the positioning of the air cylinders so that their operating pistons are connected directly to the yoke which shifts the clutch cones, thereby eliminating a number of parts (such as connecting rods, linkage, etc.) which not only complicate the mechanism but develop lost motion and consequently affect the spontaneous operation of said clutches. As shown in Figure 3, air cylinders 417 and 418 are mounted on a vertical web or partition 419 within the head stock 20 and in close proximity to the feed-change clutches 39—40 and 41—42, respectively. These air cylinders may be one casting or unit divided by a central partition. Each cylinder is provided with a stemmed piston $417^a$ and $418^a$, respectively, the stems or rods of said pistons being arranged substantially parallel to the axis of said clutches 39—40 and 41—42. The cylinders 417—418 are preferably arranged so that their respective piston rods extend from them in opposite directions and disposed adjacent the clutch cones 43 and 44, respectively, the ends of the piston rods being pivotally connected, respectively, to the rocker arms 420 fast on shafts 421 extending through and suitably journaled in partition walls 419, the other end of said shafts having fast thereon rocker arms 423 attached to clutch yokes 424 extending in the circumferential groove in their respective clutch cones 43 and 44. On each lever 420 is a projecting lug 425 which moves between adjustable abutments 426 and 427 so that the movement of the clutch cone may be nicely adjusted.

Both cylinders 417 and 418 are connected with an air pressure source at their opposite ends so as to render the pistons therein double-acting —that is power operated in both directions. Thus, one end of the cylinder 417 is connected by the air line $B^2$ to the solenoid air valve B' so that the piston $417^a$ may be moved to operate the cone 43 to engage the clutch 39 and disengage said cone from the clutch 40, while the other end of the cylinder 417 is connected by an air line $C^2$ to solenoid air valve C' so that the piston $417^a$ may be moved to operate the cone 43 to engage clutch 40 and disengage clutch 39 (see Figure 4). Cylinder 418 is connected by air line $D^2$ to solenoid air valve D' to move piston $418^a$ to operate cone 44 to engage clutch 41 and disengage clutch 42, while the other end of cylinder 418 is connected by air line $E^2$ to solenoid air valve E' to move its piston $418^a$ to operate clutch cone 44 to engage clutch 42 and to disengage clutch 41 (see Figure 4). The solenoids of these air valves B', C", D', and E' are energized respectively by the single-pole snap-switches B, C, D, and E which are closed by appropriate dogs 122 adjustably mounted, as required for a desired operation of machine, on the dog drum 121 to effect the four speed-changes which have been described above.

As can be seen from Figure 4 and the disposition of the shafts in Figure 2, the gears 82, 84 and 86, which are driven by the clutches 81, 83 and 85 respectively, are grouped about the cluster gear (88—89—90) fast with the main feed clutch 87. The feed gears 82, 84 and 86 and the respective clutches 81, 83 and 85, are shown in Figure 3 together with their clutch cones 91, 92 and 93 (although, for the purpose of clarity, the main feed clutch 87 and its cluster gear is not shown in Figure 3). The clutch cones 91, 92 and 93 are actuated to engage their clutches by air actuated pistons 428ª, 429ª and 430ª mounted, respectively, in air cylinders 428, 429 and 430 pivotally mounted at one of their ends, at 431 to an end wall of the head stock casing 20 so as to permit slight movement of the cylinders to compensate for operational movements of their pistons. The rods of piston 428ª, 429ª and 430ª extend from the other end of their cylinders and in the same general direction as the shafts 78, 79 and 80 upon which the clutch cones 91, 92 and 93 are splined and each piston rod is operatively connected with one of said cones, respectively. Said connections between the piston rods 428a, 429a, and 430a and their respective cones 91, 92 and 93, are identical and comprise the free end of the lock piston rod being connected to rocker arms 432, 433 and 434, respectively, which are fast on one end portion of shafts 428ᵇ, 429ᵇ and 430ᵇ, respectively, and the other end of said shafts being disposed adjacent their clutch cones 91, 92 or 93 and having fast thereon a rocker arm 432ª, 433ª and 434ª which carries a yoke 91ª, 92ª and 93ª each extending into a customary circumferential groove in their clutch cones. Said shafts 428ᵇ, 429ᵇ and 430ᵇ are journaled in the vertical partition wall 419.

Feed-change cylinders 428, 429 and 430 are each connected by air pipe lines J², K² and L² to their respective solenoid air valves J', K' and L' so as to be single-acting under air pressure for engaging their respective clutches 81, 83 and 85 when air is introduced into said cylinders. As shown in Figure 3, the piston 430ª has been air actuated to engage clutch cone 93 with the clutch 85 and, when air is released from the cylinder 430 by the exhausting of its solenoid air valve L', the clutch cone remains engaged with the clutch 85. When one of said clutches 81, 83 and 85 are so engaged, the other of said clutches are disengaged by a very simple and novel arrangement of three levers 436, 437 and 438, and which arrangement is permitted by the air cylinders 428, 429 and 430 and their respective pistons being disposed in spaced side-by-side position and in substantially the same plane, as shown in Figures 3 and 4. To this end, the rods of pistons 428ª, 429ª and 430ª are each provided with adjustable shoulder or abutment 428ᶜ, 429ᶜ and 430ᶜ, respectively. A teeter lever 436, intermediately pivoted to the partition 419, extends between pistons rods 428ª and 429ª and has its ends in the plane of movement of said shoulders 428ᶜ and 429ᶜ to be contacted by the latter. A similar teeter lever 437 has its ends similarly disposed between shoulders 429ᶜ and 430ᶜ and pistons 429ª and 430ª. A third teeter 438 is similarly mounted as the other two but extends between the piston rods 428ª and 430ª, and has its ends in the path of movement of abutting contact shoulders 428ᵈ and 430ᵈ. Thus, it will be seen that if air is admitted to any one of cylinders 428, 429 or 430, the pistons of the other two cylinders will be moved to the right, in Figure 3, and fully disconnect the clutches associated therewith—provided, the air pressure has been exhausted from said latter two cylinders. It will be obvious that this arrangement of levers 436, 437 and 438 also serves as a mechanical interlock and assures against more than one clutch 81, 83 or 85 being engaged at any one time. The solenoids of these feed-change air valves J', K' and L' are energized, respectively, by the single-pole snap-switches J, K and L which are closed by appropriate dogs 122 adjustably mounted on the dog drum 121 to effect the desired changes in the feed movement of the turret slide 23 and cross slides 25 and 26.

The solenoid air valves B', C', D', E', F', J', K' and L' are of a well-known standard three-way type that pass air pressure therethrough when the solenoid is energized and when de-energized cuts off the passage of air therethrough from the supply source and exhausts the air pressure on its outlet side. One type of such valve that is now employed comprises an elongated casing having an opening in its lower end which is threaded on a main air pressure supply line 439 having a pressure regulator 449ª, of any well known type, therein (Figures 2 and 4) so as to normalize the air pressure flowing to the valves against violent fluctuations occurring in the air pressure system. Also, a pressure switch 440 is connected in the air supply line 439 and functions as a safety cut-out device by controlling an electric circuit, 476ª—476ᵇ, that stops motors M and 100 to render the machine inoperative when the air pressure falls below a safe operating pressure for actuating the clutches of the machine.

The interior of the valve casing 441 (Fig. 10) is divided transversely by a partition having a bore therein longitudinally of said casing. The bore has an inlet-port 442 and a lateral outlet port 442ª to which pipe connections may be made, and the ends of the bore are provided with seats 443 and 444. A rod 445, of much less diameter than the bore, extends loosely through said bore and has a valve 446 on its upper end to cooperate with the seat 443 and has its other end extending beyond the seat 444 when valve 446 is on its seat 443. A valve 447 is slidably disposed in the lower casing chamber to cooperate with its seat 444 and is normally spring biased to seating position to cut off air pressure from the supply line 439; and, in this position engages and lifts the rod 445 to unseat the valve 446, thus communicating the outlet port 442ª with an exhaust port 448 positioned in the valve casing 441 beyond the seat 443 and, thereby, exhausting the air pressure from the aforesaid air cylinder to which the valve casing is connected. A solenoid 449 is mounted on top of the valve casing 441 and, when energized, its armature 449ª depresses the rod 445 to seat valve 446 on its seat 443 (thus cutting-off the communication between exhaust port 448 and outlet port 442ª) and, at the same time, the lower end of the rod 445 is projected beyond the seat 444 and, thereby, unseats valve 447 against its bias—thus allowing air pressure to flow from supply pipe 439, past seat 444 and through outlet port 442ª, until the solenoid 449 is de-energized when the spring 450 moves the armature to raised position allowing the valve 447 to be seated which pushes rod 445 to unseat valve 446 and open outlet port 442ª to exhaust 448.

The clutch cone 96, as before described, serves both the main feed clutch 87 and the fast-motion clutch 94, more clearly shown in Figures 1 and 4, and is moved to its two clutching positions and to its neutral position by a plunger mechanism P that is actuated by air pressure to engage fast-motion clutch 94 and to disengage main feed clutch 87 or to neutral position and that is actuated by spring biasing means to engage the main feed clutch 87 and disengage the fast-motion clutch 94. This plunger mechanism is shown in detail in Figures 11 to 13, inclusive, and is indicated in Figures 1 and 2 as disposed in about the center of the headstock casing 20 behind the dog drum 121.

The plunger mechanism P comprises a cylinder 451 having slidable therein a plunger 452. Projecting from one end of the plunger and through the end wall of the cylinder is a stem 453 which has its free end portion in successive steps to form two circumferential shoulders 454 and 455 each of progressively reduced radii toward the extremity of the stem. A rod 456 slidably extends through an opening in the other end wall of the cylinder 251 and through an axial bore 457 passing through the plunger and its stem and is threadedly connected with said stem at the free end of the latter and by a lockwasher and nut. The bore 457 is of greater diameter than said rod 456 (except at the threaded connection of the rod with the stem) to accommodate a helical compression spring 458 that has one end bearing on a shoulder formed by the bore at point of connection with said rod and has its other end bearing against a shoulder, formed by a recess 451ª as an extension of said bore, provided in the end wall of the cylinder opposite the stem 453 (Figure 12). The rod 456 has its other end extending into a bifurcated portion of the distal end of a supporting lever 459 pivoted on a stub shaft 460 to oscillate thereon (Figures 1 and 11). The distal end of lever 459 has a transverse bore therein bisecting said bifurcation and through which a pin 461 extends to pivotally connect said rod 456 to said lever. A clutch yoke 96ª has its shank inserted into the end of bore in said lever 459 and its yoke portion embracing the clutch cone 96 and lying within the customary circumferential groove in said cone. Thus, it will be clear that the position of the plunger 452 determines the position of clutch cone 96 and, consequently, the engagement or disengagement of the clutches 87 and 94 and, also, that the force of compression spring 458 against the plunger is in the direction required to engage the cone 96 with the main feed clutch 87, which gives the plunger 452 the position shown in Figures 4 and 12.

Laterally extending from the end plate of the cylinder 451 through which its plunger stem 253 projects, is a bracket 463 which supports a latch bolt 464 slidably mounted in a bore or passage in a boss or enlargement on the bracket for movement at substantially right angles to the stem 453 and whose detent end is positioned to engage and cooperate with the stepped-end portion of said stem. The latch 464 is suitably biased, such as by springs 465, to have its detent end normally contact and ride upon said three stepped surfaces at the end portion of the stem 453 and to be withdrawn, against its bias, out of complete contact with (or out of the plane of movement of) said stem by a solenoid H' mounted on the bracket 463 and connected with said latch. The boss or enlargement, in which said latch is mounted, is provided with an air passage 466 that is bisected by the latch 464 and has one end leading into the cylinder 451 at 466ª on the stem-side of the plunger 452 and its other end exhausting to the atmosphere as at 466ᵇ. The air supply line 439 is connected with the air passage 466 between its connection 466ª with said cylinder 451 and the latch 464. The latch 464 is formed with a reduced portion or port 467 so positioned thereon that when the solenoid H' withdraws the latch as shown in full lines in Figure 12, said port 467 aligns with the passage 466 to release any air pressure within the cylinder 451 to the atmosphere through port 466ª. The purpose of exhausing the cylinder 451 at this point and time is to eliminate any dash-protection of plunger 452 and to rapidly exhaust all air pressure that may be present due to the valve F' not exhausting with sufficient celerity when its operation is immediately followed by the operation of the feed-switch H or when the fast-motion lever f is being held in lifted position by hand when feed-switch H is being operated by dogs on the dog-drum 121. When the solenoid H' is de-energized, the springs 465 shift the latch and the armature of the solenoid to the full line position shown in Figure 12, where the port 467 in the latch is moved out of alignment with the air passage 466 thus closing the exhaust port 466ᵇ and end of the latch again engages and rides upon the stepped end portion of plunger stem 453. The moving parts of the plunger mechanism P are, as at present constructed, ground-and-lap fitted with their complemental stationary parts, where necessary.

The air pressure introduced into the cylinder 451 at 466ª is controlled by solenoid air valve F'—in the supply line 439 and energized by the double-throw-fast-motion switch F, that is manually biased against operation by a suitable placed dog 122 of the dog drum 121—to force the plunger 452 in the direction required to compress spring 458 and to engage the clutch cone 96 with fast-motion clutch 94. As the plunger 452 reaches the half-way position in its movement from feed position to fast-motion position (Figure 12), the latch 464, biased to normally engage the stepped end portion of the stem 453, engages the first reduced portion of said stem forming shoulder 454 and, if solenoid air valve F' is de-energized at this time, said latch will be engaged by shoulder 454, thus preventing compression spring 458 from returning plunger 452 to its feed position (shown in full lines Figure 12), and retaining the clutch cone 96 in its neutral position thus stopping all automatic or power driven movement of the turret slide 23 and cross-slides 25 and 26.

However, should the solenoid air valve F' remain energized, the plunger 452 will continue to its fast-motion position and shift clutch cone 96 into engagement with the fast-motion clutch 94, at which point in the plunger travel the latch 464 will engage the last step on the plunger stem 453, and consequently its shoulder 455, and hold the plunger, and thus the clutch cone 96, in fast motion position. Air pressure now is cut-off from cylinder 251 by the operation of solenoid air valve F' and the opening of its exhaust port 448.

When it is desired to change the movement of the turret slide 23 from fast-motion to feed motion, a dog 122 suitably placed on the dog-drum 121 will actuate double-throw switch H to energize solenoid H' which withdraws latch 464 from latched position, whereupon the port 467 in latch 464 registers with passage 466 permitting rapid exhausting of air from the stem side of cylinder 451 through exhaust port 466ᵇ so that the compression spring 458 will quickly force the plunger 452 to its feed position as shown in full lines of Figure 12. In the operation of turret lathes, it has been found with plunger mechanism P that the uniform fast operation of a spring 458, or its equivalent, is desirable to provide repeated accuracy in timing, when changing from fast-motion of the turret slide to its feed motion; whereas the slight variations due to changing air pressure, when changing from feed motion to fast motion is tolerable.

Also secured to the plunger cylinder 451 is a bracket 468 located adjacent the stepped end portion of the plunger stem 453. This bracket carries normally open single-pole single-throw switches 469 and a single-pole double-throw switch 470 suitably arranged so that their spring-loaded button portions may be operated, respectively, by bell crank levers 471 and 472, intermediately pivoted on a pivot pin 473 to the bracket 468. One end of each bell crank lever 471 and 472 engages, respectively, the button ends of switches 469 and 470 and is normally biased in that engagement by springs 474 disposed under said ends of the levers and seated in recesses formed in the bracket 468. The other ends of said bell crank levers have adjustable abutment screws 469$^a$ and 470$^a$ threaded therein to contact a lever 475 which has one end pivotally mounted on said pin 473 and its other end in contact with the shoulder 454 on the plunger stem 453. The springs 474 act also to maintain the screw abutments 469$^a$ and 470$^a$ in contact with the lever 475. The screw abutment 469$^a$ is so adjusted as to operate switch 469 against its bias to close it just after the plunger 453 leaves its feed position and again to open said switch just as said feed position is reached; and switch 470 is operated against its bias to close one circuit and open another just before the plunger reaches its neutral position when moving from feed position to fast-motion position and again is allowed to close the latter circuit and open the former, under its bias, just after said plunger leaves its neutral position, when moving from its fast-motion position to its feed position. These switches 469 and 470 are employed for conditioning control circuits according to the position of the plunger 253 in order to stop movements of the turret slide.

The operation of the combined turret lathe herein shown and described is controlled by the electrical circuits shown diagrammatically in Figure 15, it being understood that such "cross the line" diagrams are clear to one familiar with the art; and for the purpose of clarification, the circuits are marginally bracketed according to the function they perform. Also, for clarification, the various interlocks or switches operated by control relays are designated by the relay number followed by hyphenated sub-numbers. From the reading of the foregoing description, it will also be clear that the switches B—L, inclusive, may be operated automatically from the dog drum 121 or manually by the hand-operated levers $b$ to $l$ inclusive, while the switch A is manually operated, only when the machine is to be hand-cranked; and the start, stop and job button switches 485, 488 and 489, on the front of the head-stock 20, are also hand-operated. The plugging switch M' of the main drive or spindle motor M is automatically actuated from the rotation of the motor in the usual manner of plugging switches as is common in the art. The air pressure switch 440 is automatically operated by the pressure of the air in the supply air line 439 and the circuit conditioning switches 469 and 470 are automatically operated by the plunger mechanism P.

In Figure 15 the main or spindle motor M, the fast motion motor 100, the coolant motor and the solenoid H' are connected to a main power line 476. A spindle motor M is of the reversible type and equipped with a conventional plugging switch generally indicated at M'. The forward rotation of the spindle motor M is controlled by relay 477 that operates switch 477—1 and the reverse rotation of the motor M is controlled by relay 478 that operates switch 478—1. The coolant motor is employed on most machine tools for circulating a cooling fluid to the work piece and tools doing the cutting operations and, therefore, form no part of this invention. The coolant motor, when a coolant is employed, is controlled by the relay 479 which actuates the starter-switch 479—1 of that motor. However, whether the coolant motor is employed or not, the relay 479 is employed in the control circuit for the purpose as will be presently seen. The fast-motion motor 100 is controlled by the fast-motion relay 480 which operates the starter-switch 480—1 of that motor. The other relays, interlocks, switches, solenoids employed in the control circuit are all illustrated in Figure 15 and their function will be described now.

The control circuit is represented by the supply lines 476$^a$—476$^b$. It is preferred to have the voltage of the control circuit constant and comparatively low (with respect to the voltage in the main line 476) to avoid accident to personnel. Therefore, a transformer 476$^c$ is interposed between the main line 476 and the control circuit 476$^a$—476$^b$. While control relays 477, 478, 479 and 480 are shown in the upper portion of Figure 15 in association with their respective operating switches or interlocks, they are also duplicated in their respective control circuits at other places shown in the diagram and opposite the marginal legend bracketed portions of the diagram in order that a clear understanding of the circuit hook-ups may be had. These control relays, as well as others that are employed—i. e., 481, 482, 483, 484 and 486—when energized or de-energized, opens or closes one or more switches which are called "interlocks" and will be identified by the number of the relay operating it, followed by a sub-numeral identifying that particular switch or interlock.

Thus, with particular reference to the "Spindle Motor" and the "Fast Motion Motor" control circuits, as indicated by the marginal brackets in Figure 15, it is to be assumed that the machine is completely stopped. To start the machine, normally open start push-button 485 (also shown in Figure 1) is pressed to close the circuit across the line 476$^a$—476$^b$ and, since relay 478 is not energized, its normally closed interlock being closed, relay 477 will be energized closing forward motion switch 477—1 of the spindle motor M. At the same time, the pressing of the start button 485 energizes solenoid 486 which releases latch 487 in the spindle motor plugging switch M', thus rendering the plugging switch free to be operated. The energizing of relay 477 opens normally closed interlock 477—2 which prevents spindle reversing relay 478 from becoming energized, when plugging switch M' is closed, due to the rotation of the spindle motor M which has just been started, and, therefore, interlock 478—2 in the circuit of relay 477 remains closed. However, relay 479, also having been energized by the pressing of start button 485, closes interlock 479—2, energizing fast motion relay 480, as hand crank switch A is bridging its contacts $a'$—$a^3$, which closes the switch 480—1 of the fast motion motor 100. By energizing the fast motion relay 480, its normally open interlock 480—2 is closed to form a holding circuit for itself across the control line 476$^a$—476$^b$ including the normally closed machine "stop" push-button 488, thus maintaining relay 480 energized as well as relays 477, 479 and 486. In this condition of the circuits the spindle motor M and fast motion motor 100 are running, as well as coolant motor if one is employed.

As the various switches and interlocks, shown in the "fast-motion-neutral-feed" bracket of the diagram Figure 15, are shown in their "feed" motion position, it will be assumed that the turret slide 23 is now in its feed motion, that the fast motion motor 100 is running and that the plunger 452 (Fig. 12) is in its feed position as shown in full lines and the clutch cone 96 is engaging main feed clutch 87 and disconnected from fast-motion clutch 94. With the plunger 452 in this position, the conditioning switches 469 and 470 are in the position shown in Figure 15, and it is further to be assumed that there are no dogs 122 on the dog drum 121 operating the fast-motion switch F, stop-feed switch G or feed switch H and that these switches are in the position shown in Fig. 15. With the switches in those positions, control relay 484 will be energized from the control line $476^a$—$476^b$ through the normally closed contacts $f'$—$f^2$ of the fast-motion switch F and the normally closed interlock 482—2, resulting in energizing relay 484 closing its holding interlock 484—1 and also closing interlock 484—2 in the line with air control valve F'.

Now, to change the movement of the turret-slide 23 from feed-motion to fast motion, either by a dog on the drum 121 or by manually lifting lever $f$, switch F will open its contacts $f'$—$f^2$ and close its contacts $f'$—$f^3$ which energizes solenoid air valve F'' (interlock 484—2 being closed as just stated) thus causing air pressure to pass through solenoid air valve F' into cylinder 451 to move plunger 452 to its fast motion position, as has been described. Movement of the plunger 452 first causes switch 469 to be operated closing contacts $y'$—$y^2$ and, as the plunger 452 approaches its mid-way or neutral position, switch 470 is operated opening contacts $x'$—$x^3$ and closing contacts $x'$—$x^2$; and neither of these changes affects the circuit energizing solenoid air valve F' because the switch F will be held to close contacts $f'$—$f^3$ long enough for the plunger 452 to reach its fast-motion position and to be locked in that position by latch 464 engaging shoulder 455, otherwise the plunger 452 will be forced back by its compression spring 458 to neutral position or feed position depending on where the plunger is in its cylinder 451 when the switch F is operated to open contacts $f'$—$f^3$.

When switch 469 was operated closing contacts $y^1$—$y^2$, control relay 481 was energized through contacts $h^1$—$h^2$ of feed-switch H, which relay thus closed its holding interlock 481—1 as well as interlocks 481—2 and 481—3 which latter energized relay 483 through closed contacts $g^1$—$g^2$ of feed-stop-switch G; and relay 483, now being energized, closed its holding interlock 483—1 as well as interlock 483—2 but, although contacts $x^1$—$x^2$ of switch 470 is now closed, relay 482 is not energized because contacts $g^1$—$g^3$ of feed-stop-switch G are open. Thus, it is clear that these changes, just mentioned, in switches 469 and 470 only condition other circuits for operation in the event a different operation of the machine is desired.

From what has just been described, the turret slide 23 is now in fast-motion and we will assume that it is traveling back or receding from the chuck 22 to its rearmost position, where the turret 165 is indexed and locked, from whence it is again moving forward, under fast-motion, to the workpiece (not shown) in the chuck 22. When the tools are less than an inch (or thereabouts) from the workpiece, the feed-switch H will be actuated, either by a dog 122 on the dog-drum 121 or by manual operation of lever $h$ (Fig. 5), to open its contacts $h^1$—$h^2$ and close contacts $h^1$—$h^3$, and whether the fast-motion-switch F has been released or not, said feed-switch H will energize relay 482 through interlock 481—2 which is now closed due to relay 481 being held energized by its holding interlock 481—1 and switch 469 having closed contacts $y^1$—$y^2$. Energizing relay 482 opened normally closed interlock 482—2, thus de-energizing relay 484 which, in turn, opened interlock 484—2 which de-energized solenoid air valve F¹, thus cutting-off air pressure to plunger cylinder 451 and opening said cylinder to the exhaust port 448 in said valve, despite the fact that fast-motion switch F may be still bridging contacts $f^1$—$f^3$. Also, the energizing of relay 482 closed its holding interlock 482—1 and further closed interlock 482—3 which latter energized plunger-latch solenoid H¹ from power lines 476. Solenoid H¹ being so energized, latch 464 is withdrawn from the plane of movement of the plunger-stem 453 and moves its port 467 in register with exhaust port $466^b$, hence compression springs 458 rapidly forces the plunger 452 to its feed position (full line in Fig. 12) thus disengaging clutch cone 96 from fast-motion clutch 94 and engaging it with main feed clutch 87, even though full air pressure may be applied to plunger at the time feed switch H is operated as previously explained; at which time a dog 122 on dog-drum 121 will have already actuated one of the feed-change switches J, K or L for the proper or desired feed movement of the turret slide 23—in Figures 3, 4 and 15 the coarse feed switch L being shown as having been selected.

As the plunger 452 moves from its fast-motion position to its feed position, just described, the lever 475, bearing on the shoulder 454 of the plunger-stem 453, is actuated by this movement of said plunger to first operate the switch 470 to open its contacts $x^1$—$x^2$ and close its contacts $x^1$—$x^3$ connected in the circuit of solenoid air valve F¹ and then, during this same movement of said plunger and just as it reaches its feed position, said lever 475 operates switch 469 to open its contacts $y^1$—$y^2$ which de-energizes relay 481, thus opening its holding interlock 481—1 and opening interlock 481—2, which latter de-energizes relay 482 thus opening its holding interlock 482—1 as well as interlock 482—3 which cuts off current to plunger-latch solenoid H¹ and allows springs 465 (Figures 11 and 12) to pull and yieldably hold latch 464 into contact with the plunger stem 453 as shown in full line of Figure 12. The movement of the latch 464 closes exhaust port $466^b$ so that air pressure may be again effectively applied to the plunger 452.

When relay 482 was de-energized, as just stated, normally closed interlock 482—2 was reclosed, thus allowing relay 484 to be energized by fast-motion switch F, if it has been released, so that the turret-slide 23 may be taken out of feed or cutting movement and returned to its rearmost position (for turret indexing) by fast motion. Assuming that fast-motion switch F has been released and has closed its contacts $f^1$—$f^2$, the relay 484 is then energized closing its holding interlock 484—1 and closing interlock 484—2 thus allowing solenoid air valve F¹ to be energized, when fast-motion switch F is operated (either by dog on dog drum 121 or manually by lever f) to open its contact $f^1$—$f^2$ and close its contacts $f^1$—$f^3$—regardless of whether feed-switch H has been released or not to open its contacts $h^1$—$h^3$ and close its contacts $h^1$—$h^2$. This type of control, where the switch which is operated last takes command over the control, is necessary to insure that, if one of the hand-operated levers f or h is held lifted by hand, thus rendering its switch effective, the turret slide will still be thrown into the motion last selected. For instance, if the subject to be machined is short, the feed switch H may still be held operated by its dog on the dog drum at the end of the turret travel, at which point a dog 122 of dog-drum will operate fast-motion F to return the turret by fast-motion rearwardly to its indexed position. Should the dog 122 on the dog drum 121 or hand-lever f be still operating fast-motion switch F to close its contacts $f^1$—$f^3$ when it is desired to throw the turret slide into feed motion, this latter will be attained when the feed switch H is operated either by dog or by hand.

Should it be desired to stop the movement of the turret slide 23 while the latter is in feed motion — that is, when the plunger 452 is in its feed position as shown in full lines, Fig. 12, and clutch cone 96 is in engagement with feed clutch 87—the stop-feed switch G may be operated, either by dog or by hand, completing a circuit through contacts $g'$—$g^3$ and solenoid air valve F', as contacts $x'$—$x^3$ are bridged by conditioning switch 470 and interlock 484—2 is now closed, thus allowing air pressure to be applied to the plunger 452 in cylinder 451; and as the plunger 452 leaves its feed position it operates conditioning switch 469 closing its contacts $y'$—$y^2$ (energizing relay 481 and closing its interlocks 481—1, 481—2 and 481—3) and, just as said plunger is about to reach its neutral position, conditioning switch 470 is operated by plunger-stem 453 to open the circuit to solenoid air valve F', thus cutting off flow of air pressure to the plunger-cylinder 451 and opening the latter to exhaust. As there is some travel of the plunger after conditioning switch 470 is thus actuated, the plunger 452 will continue slightly in its movement until the latch 464 engages shoulder 454 on the plunger stem whereby the plunger (and the clutch cone 96) will be held in its neutral position. Control relay 483 was not energized when interlock 481—3 was closed, due to the energizing of relay 481 through conditioning switch 469, because when switch G was operated to stop the feed (prior to the closing of contacts $y'$—$y^2$) it opened its contacts $g'$—$g^2$ breaking the circuit to the relay 483. Therefore, since relay 483 was not energized, its interlock 483—2 was open when conditioning-switch 470 closed its contacts $x'$—$x^2$ thus also keeping the circuit to relay 482 open. In this condition of the control circuit the clutch cone 96 will be in its neutral position and no power drive will be imparted to the turret slide 23.

On the other hand, should it be desired to stop the movement of the turret-slide while the latter is in its fast-motion—that is, when the plunger 452 is in its extreme dotted line position as shown in Figure 12 and clutch cone 96 is in engagement with fast-motion clutch 94—stop-feed switch G is operated, either by dog or by hand, opening its contact $g'$—$g^2$ and closing its contacts $g'$—$g^3$ to establish a circuit to relay 482 through contacts $x'$—$x^2$ of switch 470 and interlock 483—2, which latter is now closed due to the fact that relay 483 has been just previously energized through contacts $g'$—$g^2$ of stop-switch G and through closed interlock 481—3 and is being held energized by its holding interlock 483—1. Relay 482 being energized as just stated, its interlock 482—3 is closed thereby and current is supplied from the power lines 476 to the plunger-latch solenoid H' which operates to withdraw the latch 464 out of the plane of movement of the plunger stem 453, thus allowing the plunger to return to its feed position as shown in full lines of Figure 12. Just as the mid-way or neutral position of the plunger is passed, conditioning-switch 470 is operated to open its contacts $x'$—$x^2$ and to close its contacts $x'$—$x^3$, but since relay 482 is still energized through its holding interlock 482—1 and through interlock 481—2 (which is still closed), solenoid air valve F' is not energized and cannot be re-energized until the plunger 452 reaches its feed position; and, just as the plunger reaches its feed position (and the clutch cone 96 is engaged with main feed clutch 87 thus braking the speed of the movement of the turret slide), conditioning-switch 469 is operated to open its contacts $y^1$—$y^2$ de-energizing relay 481 which, in turn, opens interlock 481—2 de-energizing relay 482. This de-energization of relay 482 opens interlock 482—3 releasing plunger-latch solenoid H' and closes interlock 482—2 which reenergizes relay 484, as contacts $f^1$—$f^2$ of fast motion switch F are now bridged. As relay 484 is now energized, its interlock 484—2 is closed establishing a circuit through solenoid air valve F' and air is admitted to the cylinder 451 (without the further operation of a dog 122 or hand-lever b to l, inclusive) to move the plunger 452 so that it may proceed to its neutral position as before described—that is, as the plunger first leaves its feed position, conditioning-switch 469 will be actuated to bridge its contacts $y^1$—$y^2$ energizing relay 481 and, just as the neutral position of the plunger is reached, conditioning-switch 470 is operated to open its contacts $x^1$—$x^3$ to open the circuit to solenoid air valve F', thus cutting off the flow of air pressure to the cylinder and opening the latter to exhaust. At this same time, the plunger-latch 464 engages shoulder 454 on the plunger stem 453, thus holding the plunger and, consequently, the clutch cone 96 in its neutral position. It is now possible, with the parts and control circuits in the condition just described, to place the turret-slide 23 again in fast-motion from the fast-motion motor 100 by operating fast-motion switch F, either by dog or by hand, or to place the slide in feed motion by operating the feed-switch H, either by dog or by hand, even though stop-feed switch G is still in its dog or hand-operated position bridging its contacts $g^1$—$g^3$ for the reasons above given.

When it is desired to stop the rotation of the spindle 21, this may be done by a dog 122 suitably positioned on the dog drum 121, or by hand-lever i, which operates spindle-stop switch I to open its contacts $i'$ and $i^2$, thus opening the circuit to the main control relay 479 and spindle-motor-forward relay 477 which, in turn, opens the switch 479—1 and switch 477—1, respectively, removing power from the coolant and spindle motors; however, fast motion motor relay 489 remains energized from line $476^a$—$476^b$ through normally closed machine-stop switch 488, closed interlock 480—2 and contacts $a^1$—$a^3$ of hand-crank switch A. The de-energization of spindle motor feed relay 477 closes normally closed interlock 477—2, thus completing the circuit to the spindle motor reverse relay 478. Reverse current is now applied to the spindle motor M bringing it to a quick stop, at which time plugging-switch M' opens its contacts $m^1$—$m^2$ removing power from the motor M. The normally closed interlock 478—2, which was open while relay 473 was energized to prevent energization of the spindle motor forward relay 477, is now closed. With the spindle stopped, it is possible, because the fast motion relay 480 is still energized and fast-motion motor 100 is running, to automatically operate the turret-slide 23 from the fast motion motor 100 as above described. However, if it is desired to stop the entire machine, instead of operating spindle-stop switch I or the feed-stop switch G, the normally closed "machine-stop" push-button 488, positioned in the control circuit 476ª—476ᵇ in advance of the "machine-start" push-button 485 may be pressed opening its contacts 1ª and 2ª and de-energizing all control relays, thus stopping all motors, which can be started again only by depressing "machine-start" push-button 485.

By depressing the "jog" push-button 489 to bridge its contacts $z^3$—$z^4$, the spindle motor relay 477 may be energized thus starting the spindle motor; but, since relay 479 is still de-energized, no holding circuit is established that will continue the rotation of the spindle when the jog button is released to open its jogging contacts $z^3$—$z^4$ and bridge or close its contacts $z'$—$z^2$. When the jog-button 489 is released the spindle motor M stops quickly through "plugging." In the circuits of the spindle motor and of the fast motion motor, overload relays 490, 491, 492 and 493 are provided, as indicated, so that, should any of the lines become overloaded the appropriate circuits will be opened.

Should the air pressure in air supply line 439 drop in pressure to a point where the air cylinders would not effectively actuate, or to a point below that at which the air pressure switch 449 is adjusted, said switch will open the control line 476ª—476ᵇ to render the control inoperative.

When it is desired to hand-crank the machine as previously explained, by the application of a suitable tool on the squared end of the dog drum worm shaft 118ª, the lever arm 129 has to be raised to allow the implement to be so attached or to engage the shaft end 118ª, thus actuating switch A. Switch A, being so actuated, will open its contacts $a'$—$a^3$, breaking the circuit to the fast-motion motor relay 480 and de-energizing the circuits embraced within the "fast-motion-feed-neutral" marginal bracket of Figure 15, and will close its contacts $a'$—$a^2$ making it possible to start the spindle motor M by pressing the start-switch 485 or jog-button 489. All of the switches shown in Figure 15 are normally biased and in the direction as indicated by tension spring 494.

Having thus described the invention in the manner in which it is to be performed it is to be understood that the precise construction and arrangement shown and described is acceptable to modification and variation. Therefore, the invention is not to be limited except by the spirit of the appended claims.

That which is claimed, as new, is:

1. In a machine-tool having a to-and-fro moving instrumentality, a drive means for actuating said instrumentality in slow feed movements and including a feed clutch, a drive means for actuating said instrumentality in fast-motion and including fast-motion clutch, and means for alternately engaging and disengaging said clutches and placing them in neutral position by disengaging both, said last means including the plunger mechanism normally biased to assume a feed clutch engaging position, means for supplying a controlled pressure to said plunger mechanism to move the same against its bias to fast-motion clutch engaging position, a detent device normally biased to lock said plunger in its fast-motion clutch engaging position and in neutral intermediate clutch disengaging position, and control instrumentalities for actuating said pressure supplying means to deliver air pressure to said plunger and to discontinue said pressure to said plunger and to selectively withdraw said detent from locked position with the plunger, whereby the feed clutch may be disengaged and the fast-motion clutch engaged under controlled pressure or the fast motion clutch disengaged and the feed clutch engaged by the bias of the plunger or both of said clutches may be disengaged.

2. In a machine-tool having a to-and-fro moving instrumentality, drive means for actuating said instrumentality in slow feed movements and including a feed clutch, drive means for actuating said instrumentality in fast-motion and including fast motion clutch, and means for alternately engaging and disengaging said clutches and placing them in neutral position by disengaging both, said last means including the plunger mechanism normally biased to assume a feed clutch engaging position, a source of fluid pressure supply connected with said plunger to move the same against its bias to fast-motion clutch engaging position, said plunger having stepped shoulders thereon corresponding to its clutch disengaging position and its fast-motion position, a detent device normally biased to engage said plunger and its shoulder portions to lock said plunger in its fast-motion clutch engaging position and in an intermediate disengaging position, and electrical control instrumentalities operable for supplying fluid pressure to said plunger or cutting off fluid pressure from said plunger and to selectively withdraw said detent from locked position with the plunger, whereby the feed clutch may be disengaged and the fast-motion clutch engaged under fluid pressure or the fast motion clutch disengaged and the feed clutch engaged under the bias of the plunger or both of said clutches may be disengaged.

3. The machine tool of claim 2 in which said detent controls a fluid exhaust port in the fluid pressure line to said plunger and arranged to open said exhaust port, when the detent is withdrawn from locking position, means for actuating said electrical control instrumentalities and which includes a pre-settable control member actuated synchronously with the movement of said to-and-fro moving instrumentality.

4. In a machine-tool having a to-and-fro moving part, a drive means for actuating said part in slow feed movements and including a feed clutch, a drive means for actuating said part in fast-motion and including a fast-motion clutch, and a shiftable member for alternately engaging and disengaging said clutches and assuming a neutral position by disengaging both, said last means including the plunger mechanism normally biased to move said member in feed clutch engaging position, a source of fluid pressure supply connected with said plunger to move the same against its bias thus moving said member to fast-motion clutch engaging position, a solenoid operated detent normally biased to lock said plunger in its fast-motion clutch engaging position and in neutral intermediate clutch disengaging position, an electrical operated valve controlling the supply of fluid pressure to said plunger or cutting off said pressure from said plunger, electric control circuits for effecting each of said positions of said plunger and said circuits being electrically interlocked, certain of said circuits controlling said valve and certain of said circuits unlocking said detent, initiating switches in said circuits for effecting the operation of said valve, the withdrawal of said detent from locked positions with the plunger, and other electric switches in said circuits and actuated by the relative positions of said plunger to condition said circuits to energize or de-energize said detent and valve, in response to the initiating switch last operated, whereby the feed clutch may be disengaged and the fast-motion clutch engaged under fluid pressure and the fast-motion clutch disengaged and the feed clutch engaged by the bias of the plunger or both of said clutches may be disengaged.

5. The machine of claim 4 in which there is a shaft connection with the to-and-fro moving part that has an end engageable by a crank, whereby said part may be reciprocated by hand-cranking, a switch in an electrical supply for said control circuits and normally bridging said supply line and said control circuits, a movable actuator connected with said last mentioned switch and having a portion normally obstructing the application of a crank to said shaft and being movable to allow said application of said crank to said shaft and to break said bridge connection thus de-energizing said control circuits.

6. The machine of claim 4 wherein there is an electrical motor for driving said fast-motion drive means, a make-and-break switch in the supply to said motor, a fast-motion relay in one of said control circuits and closing said motor switch, when said relay is energized, and opening said motor switch, when de-energized.

7. In a machine-tool, a to-and-fro moving part, drive means for actuating said part in slow feed movements and including a feed coupler, drive means for actuating said part in fast-motion and including a fast-motion coupler, and a shiftable member for alternately engaging and disengaging said coupler and assuming a neutral position by disengaging both couplers, said shiftable member being normally biased to move to feed coupling position, means supplying a pressure to said member to move the same against its bias to fast-motion coupling position, a detent device normally biased to lock said member in its fast-motion coupling position and in neutral intermediate position disengaging both said couplers, and electrical instrumentalities for actuating said pressure supply means to said member or to cut off said pressure and for withdrawing said detent from locked position with the member, whereby the feed coupler may be disengaged and the fast-motion coupler engaged or the fast-motion coupler disengaged and the feed coupler engaged by the bias of said shiftable member or both of said couplers may be disengaged.

8. The machine-tool of claim 7 wherein there are electrical slide-control circuits for effecting each of said positions of said shiftable member and said circuits being electrically interlocked, certain of said slide-control circuits controlling said electrical instrumentalities of said pressure supply means and of said detent, and initiating switches in said slide-control circuits for rendering the latter effective or ineffective.

9. The machine-tool of claim 7 wherein there are electrical slide-control circuits for effecting each of said positions of said shiftable member and said circuits being electrically interlocked, certain of said slide-control circuits controlling said electrical instrumentalities of said pressure supply means and of said detent, and initiating switches in said slide-control circuits for rendering the latter effective or ineffective, and other switches in said slide-control circuits and actuated by the positions of said shiftable member to condition said circuits to energize or de-energize said electrical instrumentalities of said pressure supply means and of said detent, in response to the operation of said initiating switches.

10. In a machine-tool, a rotatable spindle, a slide movable to-and-fro relative to the spindle, a drive means for said spindle and having an operative connection with said slide to move the latter with relatively slow feed-motions and including a feed coupler, a drive means connected with the slide to move the latter with a relatively rapid fast-motion and including a fast-motion coupler, an electrical control circuit for rendering said spindle drive means effective or ineffective and including therein a normally open start-switch biased to open position and a normally closed stop-switch biased to closed position and disposed in the line in advance of the start-switch, a fast-motion relay in a circuit fed by said spindle motor control circuit and controlling said fast-motion drive to said slide and being energized, when said start-switch is closed, a normally open holding interlock circuit for said relay fed from said spindle motor control circuit at a point between said start-switch and said stop-switch, whereby said relay is held energized when said start-switch is released and opens under its bias, and a shunt circuit connecting said spindle drive control circuit beyond said start-switch and to said relay circuit at a point between said relay and its holding interlock, whereby said spindle drive control circuit will remain energized when said start-switch opens.

11. The machine-tool of claim 10 where there is a normally closed spindle-stop initiating switch in said shunt circuit and which, when opened, de-energizes the spindle drive control circuit but allows said fast-motion relay to remain energized.

12. The machine-tool of claim 10 where there is a normally closed spindle-stop initiating switch in said shunt circuit and which, when opened, de-energizes the spindle drive control circuit but allows said fast-motion relay to remain energized, an interlock in said shunt circuit, and a relay in said spindle drive control circuit and energized by the latter to close said interlock and to open said interlock when de-energized, whereby said spindle drive remains stopped after said spindle-stop switch is closed, but the fast-motion relay may still remain energized.

13. The machine-tool of claim 10 wherein there is a mechanical means connected with said slide for hand-cranking said slide, a hand-crank switch biased to bridge from said shunt circuit to said fast-motion relay at a point between said fast-motion relay and its holding interlock to establish said fast-motion relay circuit, an operative connection between said hand-cranking means and said hand-crank switch that opens said hand-crank switch from its normal bridging position, when said hand-cranking means is operated, thus de-energizing said fast-motion relay.

14. The machine-tool of claim 10 wherein there is a mechanical means connected with said slide for hand-cranking said slide, a hand-crank switch biased to bridge from said shunt circuit to said fast-motion relay at a point between said fast-motion relay and its holding interlock to establish said fast-motion relay circuit, an operative connection between said hand-cranking means and said hand-crank switch that opens said hand-crank switch from its normal bridging position, when said hand-cranking means is operated, thus de-energizing said fast-motion relay, and a by-pass line fed from the spindle drive control circuit at a point between said start-switch and said stop-switch, said crank-switch bridging said by-pass line, when moved from its normal bridging position, thereby holding said spindle drive control circuit energized.

15. The machine-tool of claim 10 wherein there is a shiftable member for alternately engaging and disengaging said couplers and assuming a neutral position by disengaging both couplers, said shiftable member being normally biased to move to feed coupling position, means supplying a pressure to said member to move the same against its bias to fast-motion coupling position, a detent device normally biased to lock said member in its fast-motion coupling position and in neutral intermediate position dis-engaging both said couplers, and electrical instrumentalities for actuating said pressure supplying means to supply to said member or to cut off said pressure and for withdrawing said detent from locked position with the member, electrical slide-control circuits fed from said fast-motion relay circuit for effecting each of said positions of said shiftable member and said circuits being electrically interlocked, certain of said slide-control circuits controlling said electrical instrumentalities of said pressure supply means and of said detent, and initiating switches in said slide control circuits for rendering the latter effective and ineffective, whereby the feed coupler may be disengaged and the fast-motion coupler engaged or the fast-motion coupler disengaged and the feed coupler engaged by the bias of said shiftable member or both of said couplers may be disengaged.

16. The machine-tool of claim 15 wherein there are other switches in said slide-control circuits and actuated by the positions of said shiftable member to condition said circuits to energize or de-energize said electrical instrumentalities of said pressure control and of said detent in response to the operation of the initiating switch that is actuated.

JOSEPH EARLE MAKANT.
GORDON WILLIAM SMITHSON.
KENNETH RICHARD WUNSCHEL.

REFERENCES CITED

The following references are of record in the file of this patent:

UNITED STATES PATENTS

| Number | Name | Date |
| --- | --- | --- |
| 1,748,540 | Curtis | Feb. 25, 1930 |
| 2,224,887 | Von Hamersveld | Dec. 17, 1940 |
| 2,351,687 | Lange | June 20, 1944 |
| 2,357,396 | Fuller | Sept. 5, 1944 |
| 2,453,120 | Curtis | Nov. 9, 1948 |
| 2,455,876 | Potter et al. | Dec. 7, 1948 |